(12) United States Patent
Jung et al.

(10) Patent No.: US 12,556,374 B2
(45) Date of Patent: Feb. 17, 2026

(54) DEVICE AND METHOD FOR UPDATING IMMOBILIZER TOKEN IN DIGITAL KEY SHARING SYSTEM

(71) Applicant: Samsung Electronics Co., Ltd., Suwon-si (KR)

(72) Inventors: Sooyeon Jung, Suwon-si (KR); Inyoung Shin, Suwon-si (KR); Jonghyo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 565 days.

(21) Appl. No.: 17/424,080

(22) PCT Filed: Jan. 16, 2020

(86) PCT No.: PCT/KR2020/000809
§ 371 (c)(1),
(2) Date: Jul. 19, 2021

(87) PCT Pub. No.: WO2020/153660
PCT Pub. Date: Jul. 30, 2020

(65) Prior Publication Data
US 2022/0131687 A1   Apr. 28, 2022

(30) Foreign Application Priority Data
Jan. 21, 2019   (KR) .................. 10-2019-0007584

(51) Int. Cl.
*H04L 9/08* (2006.01)
*H04L 9/32* (2006.01)

(52) U.S. Cl.
CPC .......... *H04L 9/0825* (2013.01); *H04L 9/0894* (2013.01); *H04L 9/3213* (2013.01); *H04L 9/3228* (2013.01)

(58) Field of Classification Search
CPC ... H04L 9/0825; H04L 9/0894; H04L 9/3213; H04L 9/3228
See application file for complete search history.

(56) References Cited

U.S. PATENT DOCUMENTS 7,317,376 B2 *  1/2008  Nakamura ............. B60R 25/04
                                                       340/5.31
7,366,677 B1   4/2008  Liu et al.
(Continued)

FOREIGN PATENT DOCUMENTS

EP   2743868 A1 *  6/2014 ............. G06Q 10/02
KR   10-2018-0028351 A   3/2018
(Continued)

OTHER PUBLICATIONS

Wei Zhuo et al., "HIBS-KSharing: Hierarchical Identity-Based Signature Key Sharing for Automotive", IEEE Access, vol. 5, Sep. 6, 2017, pp. 16314-16323, XP011660052.
(Continued)

*Primary Examiner* — John B King
*Assistant Examiner* — Alex D Carrasquillo
(74) *Attorney, Agent, or Firm* — Jefferson IP Law, LLP

(57) ABSTRACT

The disclosure relates to a method of updating an immobilizer token. A target device according to various embodiments of the disclosure may generate a first temporary encryption key pair for encryption and decryption of an immobilizer token, may transmit, to an immobilizer token issuance device, an immobilizer token issuance request including a first temporary public encryption key of the generated first temporary encryption key pair, may receive, from the immobilizer token issuance device, an encrypted immobilizer token and a second temporary public encryption key generated by the immobilizer token issuance device, may decrypt the encrypted immobilizer token by using the second temporary public encryption key and a first
(Continued)

temporary private encryption key of the first temporary encryption key pair, and may store the decrypted immobilizer token in a confidential mailbox of the digital key in a secure element.

15 Claims, 21 Drawing Sheets

(56) References Cited

U.S. PATENT DOCUMENTS

| | | | | |
|---|---|---|---|---|
| 9,509,499 | B2* | 11/2016 | Kawamura | H04L 9/0869 |
| 9,780,952 | B1* | 10/2017 | Behm | H04L 63/1466 |
| 9,786,108 | B2* | 10/2017 | Spiess | G07C 9/00309 |
| 10,030,590 | B2* | 7/2018 | Hagedorn Maillard | F02D 29/02 |
| 10,339,739 | B2* | 7/2019 | Mala | G06F 16/2455 |
| 11,485,317 | B2* | 11/2022 | Hutanu | G07C 9/00571 |
| 11,777,936 | B2* | 10/2023 | Galdo | H04W 12/084 |
| | | | | 713/156 |
| 2014/0169564 | A1* | 6/2014 | Gautama | G07C 9/00309 |
| | | | | 380/270 |
| 2017/0104589 | A1 | 4/2017 | Lambert et al. | |
| 2018/0213405 | A1 | 7/2018 | Jung et al. | |
| 2018/0370486 | A1* | 12/2018 | Chin | B60R 25/20 |
| 2020/0052905 | A1* | 2/2020 | Mathias | H04L 9/0861 |

FOREIGN PATENT DOCUMENTS

| | | |
|---|---|---|
| KR | 10-2019-0001217 A | 1/2019 |
| WO | 2018/160863 A1 | 9/2018 |

OTHER PUBLICATIONS

Extended European Search Report dated Jan. 17, 2022, issued in European Patent Application No. 20744644.4-1218.
Christoph Busold et al., "Smart Keys for Cyber-Cars: Secure Smartphone-based NFC-enabled Car Immobilizer", CODASPY '13: Proceedings of the third ACM conference on Data and application security and privacy, Feb. 2013, pp. 233-242.
International Search Report and Written Opinion dated May 4, 2020, issued in International Patent Application No. PCT/KR2020/000809.
Chinese Office Action dated Oct. 23, 2023, issued in Chinese Patent Application No. 202080010003.7.
Korean Office Action dated Mar. 11, 2024, issued in Korean Patent Application No. 10-2019-0007584.
Ephemeral Diffie-Hellman with RSA (DHE-RSA), Aug. 31, 2018.
Chinese Office Action dated May 18, 2024, issued in Chinese Patent Application No. 202080010003.7.
European Office Action dated Apr. 11, 2024, issued in European Patent Application No. 20744644.4.
Korean Office Action dated Nov. 22, 2024, issued in Korean Patent Application No. 10-2019-0007584.
Chinese Office Action dated Dec. 13, 2024, issued in Chinese Patent Application No. 202080010003.7.

* cited by examiner

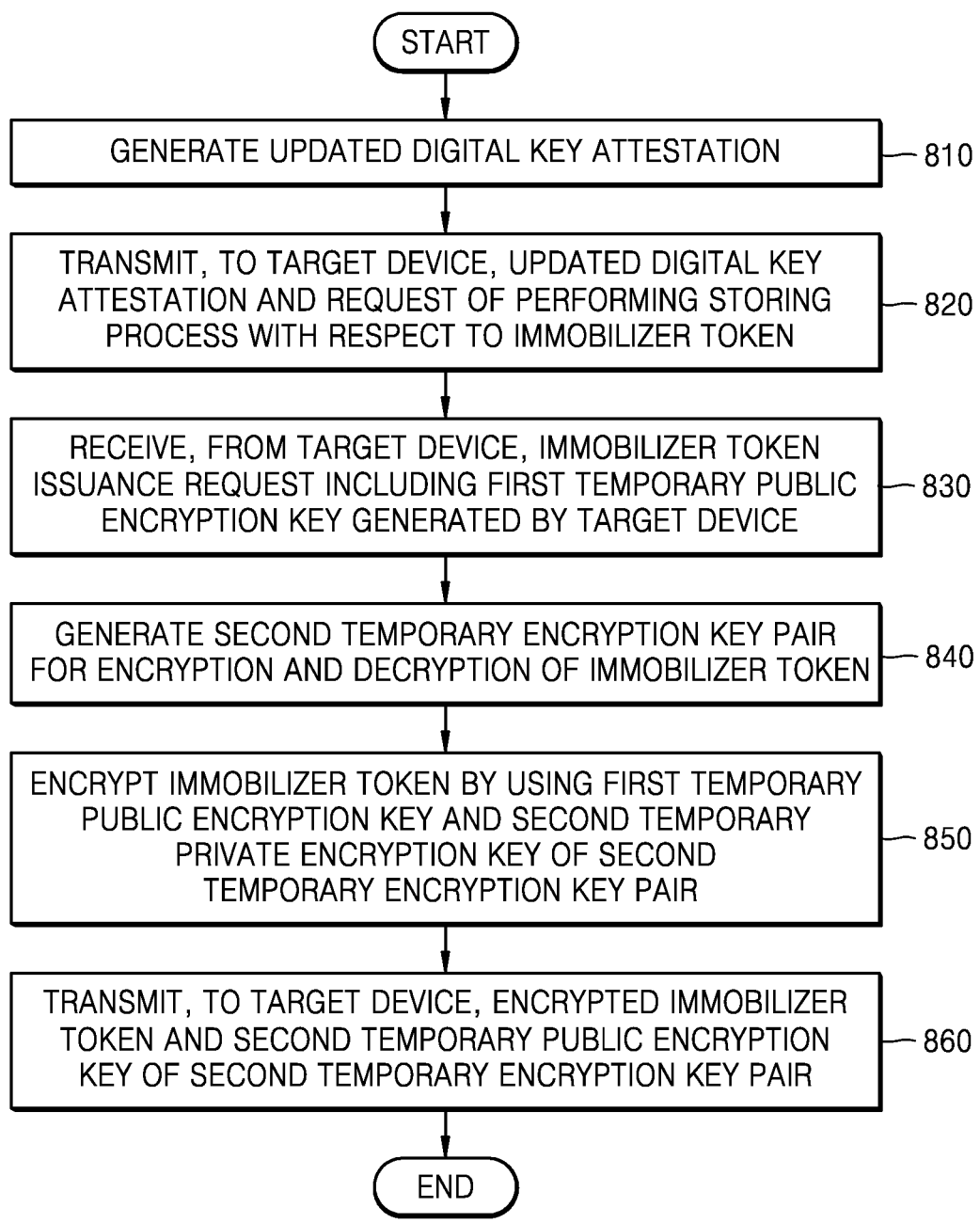

DEVICE AND METHOD FOR UPDATING IMMOBILIZER TOKEN IN DIGITAL KEY SHARING SYSTEM

CROSS-REFERENCE TO RELATED APPLICATION(S)

This application is a U.S. National Stage application under 35 U.S.C. § 371 of an International application number PCT/KR2020/000809, filed on Jan. 16, 2020, which is based on and claimed priority of a Korean patent application number 10-2019-0007584, filed on Jan. 21, 2019, in the Korean Intellectual Property Office, the disclosure of which is incorporated by reference herein in its entirety.

TECHNICAL FIELD

The disclosure relates to a device and method for updating an immobilizer token in a digital key sharing system.

BACKGROUND ART

With the supply of personalized electronic devices, such as smart phones and tablet personal computers (PCs), technologies for performing security, authentication, and the like using digitized virtual keys (i.e., digital keys) have been developed. As one method of digital key technology, a technology of integrating a digital key to a mobile device, for example, a smart phone, by using a wireless communication technology, such as near field communication (NFC), is being developed.

As the digital key is inserted into the mobile device, a user of the mobile device may open or close a door by using the digital key replacing a physical key. Also, a function of the digital key is further extended such that the user of the mobile device may use the digital key to access a device or control the device.

The use of a digital key can bring great improvements in user convenience and industrial effects, but concerns regarding security have also been raised. Due to characteristics of the digital key that needs to be combined with an electronic device, the digital key may be exposed to a risk, such as hacking with respect to the electronic device. Accordingly, it is necessary to manage the digital key and update an immobilizer token in a high-security area.

DESCRIPTION OF EMBODIMENTS

Solution to Problem

Various embodiments of the disclosure provide a device and method for updating an immobilizer token in a digital key sharing system.

BRIEF DESCRIPTION OF DRAWINGS

FIG. 8 is a flowchart of an operating method of the owner device that directly issues an immobilizer token to the target device so as to update the immobilizer token according to an embodiment.

BEST MODE

Figure 1:
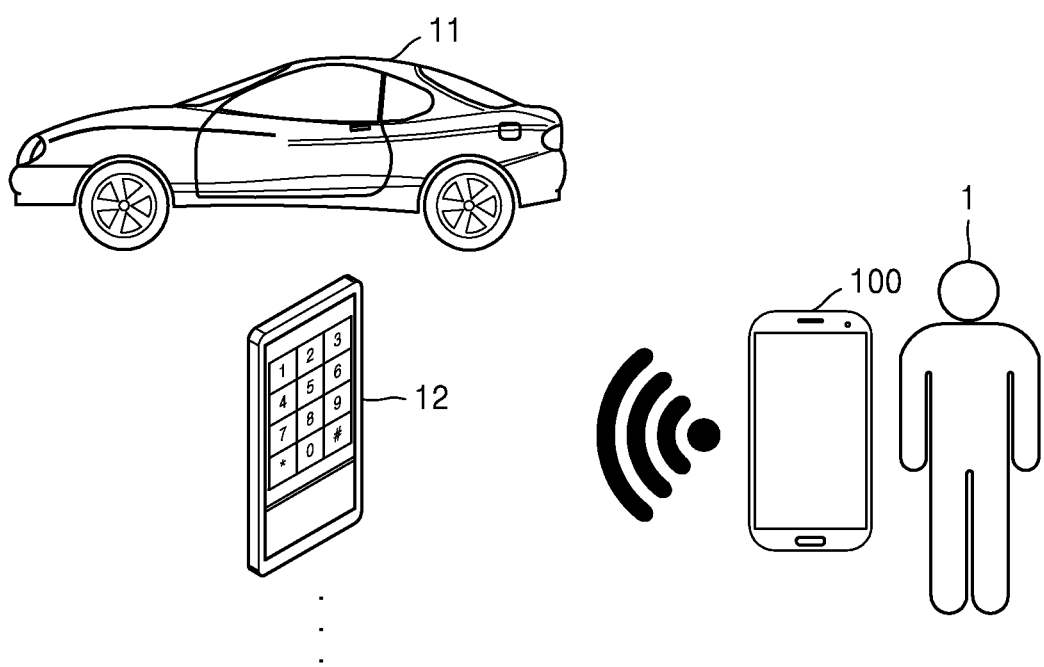
FIG. 1 is a diagram for describing an environment to which a digital key is applied.

According to an embodiment of the disclosure, an operating method of a target device may include: receiving a request of performing a storing process with respect to an immobilizer token corresponding to a digital key, from an owner device having issued the digital key to the target device or from an electronic device being controlled by the digital key; generating a first temporary encryption key pair for encryption and decryption of the immobilizer token; transmitting, to an immobilizer token issuance device, an immobilizer token issuance request including a first temporary public encryption key of the generated first temporary encryption key pair; receiving, from the immobilizer token issuance device, an encrypted immobilizer token and a second temporary public encryption key generated by the immobilizer token issuance device; decrypting the encrypted immobilizer token by using the second temporary public encryption key and a first temporary private encryption key of the first temporary encryption key pair; and storing the decrypted immobilizer token in a confidential mailbox of the digital key.

According to an embodiment of the disclosure, an operating method of an immobilizer token issuance device may include: receiving, from a target device, a request of issuing an immobilizer token which includes a first temporary public encryption key generated by the target device and corresponds to a digital key of the target device; generating a second temporary encryption key pair for encryption and decryption of the immobilizer token; encrypting the immobilizer token by using the first temporary public encryption key and a second temporary private encryption key of the generated second temporary encryption key pair; and transmitting, to the target device, the encrypted immobilizer token and a second temporary public encryption key of the second temporary encryption key pair.

According to an embodiment of the disclosure, a target device may include: a communicator configured to communicate with an external device; a secure element (SE) configured to store a digital key issued by an owner device; a memory storing a program and data for processing the digital key; and at least one processor configured to execute the program stored in the memory to receive a request of performing a storing process with respect to an immobilizer token corresponding to a digital key, from an owner device having issued the digital key to the target device or from an electronic device being controlled by the digital key, generate a first temporary encryption key pair for encryption and decryption of the immobilizer token, transmit, to an immobilizer token issuance device, an immobilizer token issuance request including a first temporary public encryption key of the generated first temporary encryption key pair, receive, from the immobilizer token issuance device, an encrypted immobilizer token and a second temporary public encryption key generated by the immobilizer token issuance device, decrypt the encrypted immobilizer token by using the second temporary public encryption key and a first temporary private encryption key of the first temporary encryption key pair, and store the decrypted immobilizer token in a confidential mailbox of the digital key in the SE.

According to an embodiment of the disclosure, an immobilizer token issuance device may include: a communicator configured to communicate with an external device; a memory storing a program and data for issuing an immobilizer token; and at least one processor configured to execute the program stored in the memory to receive, from a target device, a request of issuing an immobilizer token which includes a first temporary public encryption key generated by the target device and corresponds to a digital key of the target device, generate a second temporary encryption key pair for encryption and decryption of the immobilizer token, encrypt the immobilizer token by using the first temporary public encryption key and a second temporary private encryption key of the generated second temporary encryption key pair, and transmit, to the target device, the encrypted immobilizer token and a second temporary public encryption key of the second temporary encryption key pair.

MODE OF DISCLOSURE

Hereinafter, embodiments of the disclosure will be described in detail with reference to the accompanying drawings such that one of ordinary skill in the art may easily implement the disclosure. However, the disclosure may be implemented in various different forms and is not limited to the embodiments described herein. Also, in the drawings, parts irrelevant to the description are omitted in order to clearly describe the disclosure, and like reference numerals designate like elements throughout the specification.

Some embodiments of the disclosure may be represented by functional block configurations and various processing operations. Some or all of these functional blocks may be implemented by various numbers of hardware and/or software configurations that perform particular functions. For example, the functional blocks of the disclosure may be implemented by one or more microprocessors or by circuit configurations for a certain function. Also, for example, the functional blocks of the disclosure may be implemented in various programming or scripting languages. The functional blocks may be implemented by algorithms executed in one or more processors. In addition, the disclosure may employ conventional techniques for electronic environment setting, signal processing, and/or data processing.

In addition, a connection line or a connection member between components shown in drawings is merely a functional connection and/or a physical or circuit connection. In an actual device, connections between components may be represented by various functional connections, physical connections, or circuit connections that are replaceable or added.

Hereinafter, the disclosure will be described in detail with reference to accompanying drawings.

FIG. 1 is a diagram for describing an environment to which a digital key is applied.

Referring to FIG. 1, an owner device 100, a user 1 of the owner device 100, and electronic devices 11, 12, and the like for performing control and access by using a digital key stored in the owner device 100 are illustrated. In various embodiments, the user 1 who uses the owner device 100 may be referred to as the owner.

The owner device 100 may include a personalized mobile device, but is not limited thereto and may include various types of electronic devices. For example, the owner device 100 may include a smart phone, a tablet personal computer (PC), a PC, a camera, or a wearable device. The owner device 100 may perform processes of generating, deleting, and managing the digital key for accessing the electronic devices 11, 12, and the like and controlling the electronic devices 11, 12, and the like, and may perform authentication on the digital key.

The electronic devices 11, 12, and the like may interwork with the owner device 100 to perform an operation for generating the digital key and may be controlled and accessed by using the digital key.

For example, the owner device 100 may store the digital key for interworking with the electronic device 11 mounted on a vehicle. The owner device 100 may control various operations of the vehicle by using the stored digital key. For example, the owner device 100 may use the digital key to open or close a door of the vehicle, start the vehicle, or control various devices mounted on the vehicle. In addition, an operation related to autonomous driving, such as an automatic parking system, may be controlled.

As another example, the owner device 100 may store the digital key for interworking with a door lock 12. The owner device 100 may open or close a door by using the stored digital key.

An electronic device controllable by the owner device 100 by using the digital key is not limited to examples shown in FIG. 1, and a digital key technology may be applied to various electronic devices. Hereinafter, for convenience of descriptions, an example in which the owner device 100 interworks with the electronic device 11 mounted on the vehicle will now be described. However, the following descriptions may also be applied to a case where the owner device 100 interworks with various electronic devices other than the electronic device 11 of the vehicle.

Figure 2:
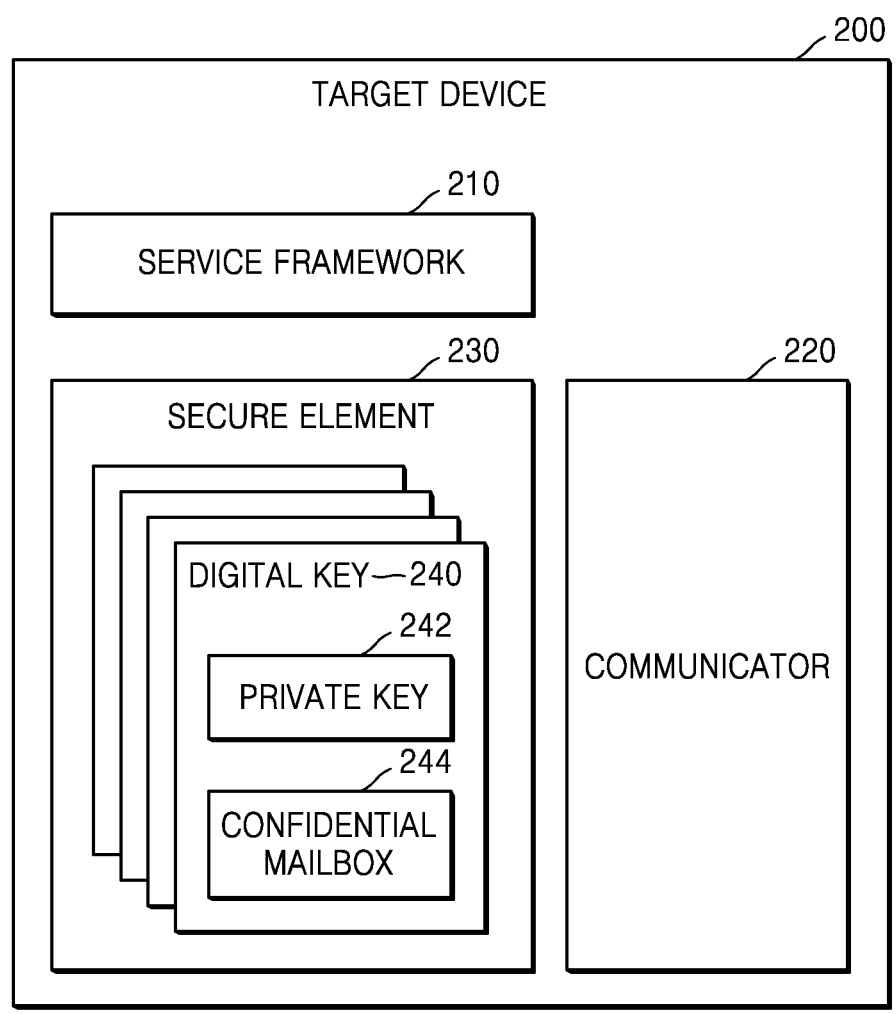
FIG. 2 is a diagram illustrating a configuration of a target device according to an embodiment.

FIG. 2 is a diagram illustrating a configuration of a target device according to an embodiment.

According to an embodiment, a target device 200 may be issued a digital key from an owner device. In various embodiments of the disclosure, the target device refers to a device that has been issued, from the owner device, a digital key capable of controlling an electronic device over which the owner device has control authority.

Referring to FIG. 2, the target device 200 may include a service framework 210, a communicator 220, and a secure element 230.

The service framework 210 may be a service application that serves as a gateway when an external server or application accesses the secure element 230. The service framework 210 may provide an application program interface (API) for an external access, and may provide functions of an access control for an access by the external server or application, command conversion, and the like.

The communicator 220 may provide a communication function with respect to an external device or an external server of the target device 200.

The secure element 230 refers to a secure data storage in a region that is separate from a processor of the target device 200. A digital key 240 of the target device 200 may be stored in the secure element 230. The secure element 230 may store a private key 242 corresponding to the digital key 240. Also, the secure element 230 may include a confidential mailbox 244 (also referred to as a confidential storage) corresponding to the digital key 240.

The confidential mailbox 244 may indicate a storage for storing confidential information related to the digital key 240. The confidential mailbox 244 may store an immobilizer token (ImmoTK or Immo Token). The immobilizer token may be information used to verify whether a device having been issued a digital key has authority over some entitlements for an electronic device that is a target to be controlled by the digital key. For example, in a case where the electronic device that is a target to be controlled by the digital key is a vehicle, whether the device having been issued the digital key has authority to start an engine of the vehicle may be verified through an immobilizer token. In a case where an immobilizer token is stored in the confidential mailbox 244 of the digital key 240 of the target device 200, the target device 200 may have authority over some entitlements capable of controlling an electronic device controlled by the digital key 240.

The owner device having issued the digital key 240 to the target device 200 may update an entitlement of the digital key 240 of the target device 200. The update of the entitlement of the digital key 240 may be performed in a manner that the owner device generates a digital key attestation indicating an updated entitlement, and transmits the generated digital key attestation to an electronic device.

For example, the owner device may update entitlement information of the digital key 240 of the target device 200, based on public information about the target device 200. The owner device may generate information including Friend.DK.PK that is a public key of the target device, the updated entitlement information, and a signature of the owner device. Such information may be referred to as the digital key attestation. The owner device may transmit the generated digital key attestation to the electronic device controlled by the digital key.

The electronic device may verify the signature of the owner device of the digital key attestation, and then may apply the updated entitlement of the digital key 240 of the target device 200. In this regard, entitlements of a digital key which are applicable based on a digital key attestation may be entitlements (e.g., to curtail/extend a validation period) that may be performed in response to a change in the digital key. The digital key attestation may include not only entitlements that may be performed in response to a change in the digital key 240 but also include update information about some entitlements that require information separate from the digital key 240. Updated entitlements of some entitlements (e.g., to grant authority to start a vehicle) among entitlements of the digital key cannot be performed as the electronic device verifies the digital key attestation and applies the updated information, but may be performed by obtaining separate information (e.g., an immobilizer token, etc.) related to the updated entitlements.

To update some entitlements from among entitlements of the digital key 240, it may be necessary to issue a new immobilizer token or to change an immobilizer token. To issue or change an immobilizer token, an access to the confidential mailbox 244 of the digital key 240 may be required. Accordingly, to update some entitlements of the digital key 240, an access to the confidential mailbox 244 of the digital key 240 may be requested.

In response to occurrence of an entitlement update event with respect to the digital key 240, the target device 200 may determine whether an update of some entitlements from among entitlements to be updated is requested and whether issuance or a change in an immobilizer token thereof is requested. When it is determined that the update of some entitlements is requested and thus, issuance or a change in the immobilizer token is requested, it may be requested for an immobilizer token issuance device to issue or change an immobilizer token.

As described above, when it is necessary to update some entitlements of the digital key 240 so as to update entitlements of the digital key 240, an access to the confidential mailbox 244 may be required to issue and change an immobilizer token. However, the immobilizer token issuance device may not have in advance authority for accessing the confidential mailbox 244 or an access key for an access. Therefore, in a case where the immobilizer token issuance device does not have pre-access authority even when the immobilizer token issuance device receives, from the target device 200, a request for issuance or a change in an immobilizer token, the immobilizer token issuance device may not be able to issue or change an immobilizer token to update the immobilizer token. Therefore, there may be a need for a method of accessing the confidential mailbox 244 of the target device 200 and then updating an immobilizer token even when the immobilizer token issuance device does not have pre-access authority.

Figure 3:
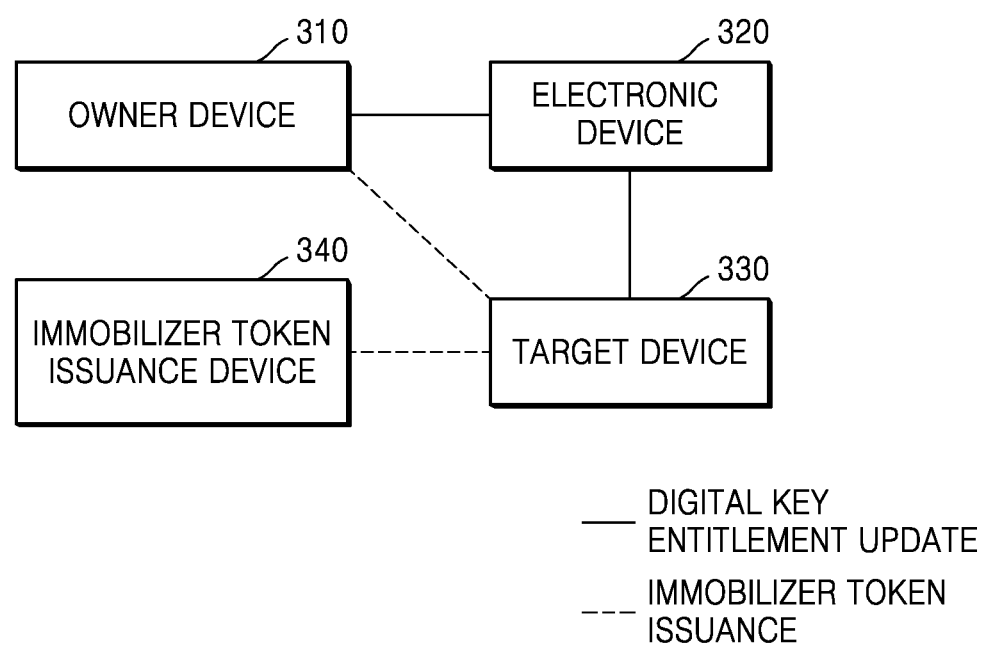
FIG. 3 is an example of a system structure for updating an immobilizer token according to an embodiment.

FIG. 3 is an example of a system structure for updating an immobilizer token according to an embodiment.

Referring to FIG. 3, an owner device 310, an electronic device 320, a target device 330, and an immobilizer token issuance device 340 may configure a system for updating an immobilizer token. To update an immobilizer token may indicate that the immobilizer token issuance device 340 issues an immobilizer token, and the target device 330 stores the issued immobilizer token.

The owner device 310 refers to a device having control authority over the electronic device 320. The electronic device 320 may be controlled by the target device 330 having been issued a digital key from the owner device 310. The target device 330 may be issued the digital key for control of the electronic device 320 from the owner device 310. Hereinafter, it is assumed that the target device 330 has been already issued the digital key from the owner device 310.

The immobilizer token issuance device 340 may issue an immobilizer token to the target device 330. In FIG. 3, it is illustrated that the immobilizer token issuance device 340 is a separate device from the owner device 310 or the electronic device 320, but the owner device 310 may be included in the immobilizer token issuance device 340. That is, in some cases, the owner device 310 and the electronic device 320 may perform a function of the immobilizer token issuance device 340.

According to an embodiment, the owner device 310 may directly issue an immobilizer token to the target device 330. For example, the owner device 310 and the target device 330 may perform direct communication by using device-to-device (D2D) connectivity including near field communication (NFC), Wireless Fidelity (Wi-Fi), Bluetooth, ultra-wideband (UWB), and the like. Also, the owner device 310 and the target device 330 may perform communication via one or more relay servers. The relay server may include a manufacturer server of the owner device 310, a manufacturer server of the electronic device 320, a manufacturer server of the target device 330, or the like, and may include a third service provision server providing a service to the owner device 310, the electronic device 320, or the target device 330.

The owner device 310 may issue an immobilizer token to the target device 330 via direction communication or communication using a relay server. In this manner, the owner device 310 may issue an immobilizer token directly to the target device 330, without involvement by the electronic device 320 nor the immobilizer token issuance device 340. When the owner device 310 issues the immobilizer token directly to the target device 330, without involvement by another device, an update of some entitlements of a digital key which do not require an update of the immobilizer token may also be performed. In this case, the owner device 310 may transmit, to the target device 330, a digital key attestation indicating an updated entitlement for the update of some entitlements of the digital key.

According to an embodiment, the owner device 310 may update the immobilizer token by using the electronic device 320. For example, the owner device 310 may transmit immobilizer token update information to the electronic device 320. In this regard, a communication scheme between the owner device 310 and the electronic device 320 may indicate a direction communication scheme using D2D connectivity including NFC, Wi-Fi, Bluetooth, Bluetooth low energy (BLE), and the like, or an indirect communication scheme via one or more relay servers. When the target device 330 accesses the electronic device 320 so as to control the electronic device 320, the electronic device 320 may transmit the immobilizer token update information, which is received from the owner device 310, to the target device 330 and may request the target device 330 to perform an immobilizer token update process. The target device 330 may be issued an immobilizer token from the immobilizer token issuance device 340, based on the received information and request. According to an embodiment, the immobilizer token issuance device 340 may be a service provision server related to the owner device 310 or the electronic device 320. In this regard, the service provision server related to the electronic device 320 may include a server of an original equipment manufacturer (OEM) (e.g., a vehicle manufacturer, etc.) manufactured the electronic device 320, a server of another service provider providing a service to the electronic device 320, or the like.

When the owner device 310 updates the immobilizer token by using the electronic device 320, the owner device 310 may directly transmit, to the electronic device 320, a digital key attestation indicating an updated entitlement for an update of an entitlement of a digital key. Upon reception of the digital key attestation, the electronic device 320 may update the entitlement of the digital key of the target device 330.

A method of updating an immobilizer token, based on a system for an update of an immobilizer token of FIG. 3, will now be described in detail with reference to FIGS. 4 to 15.

Figure 4:
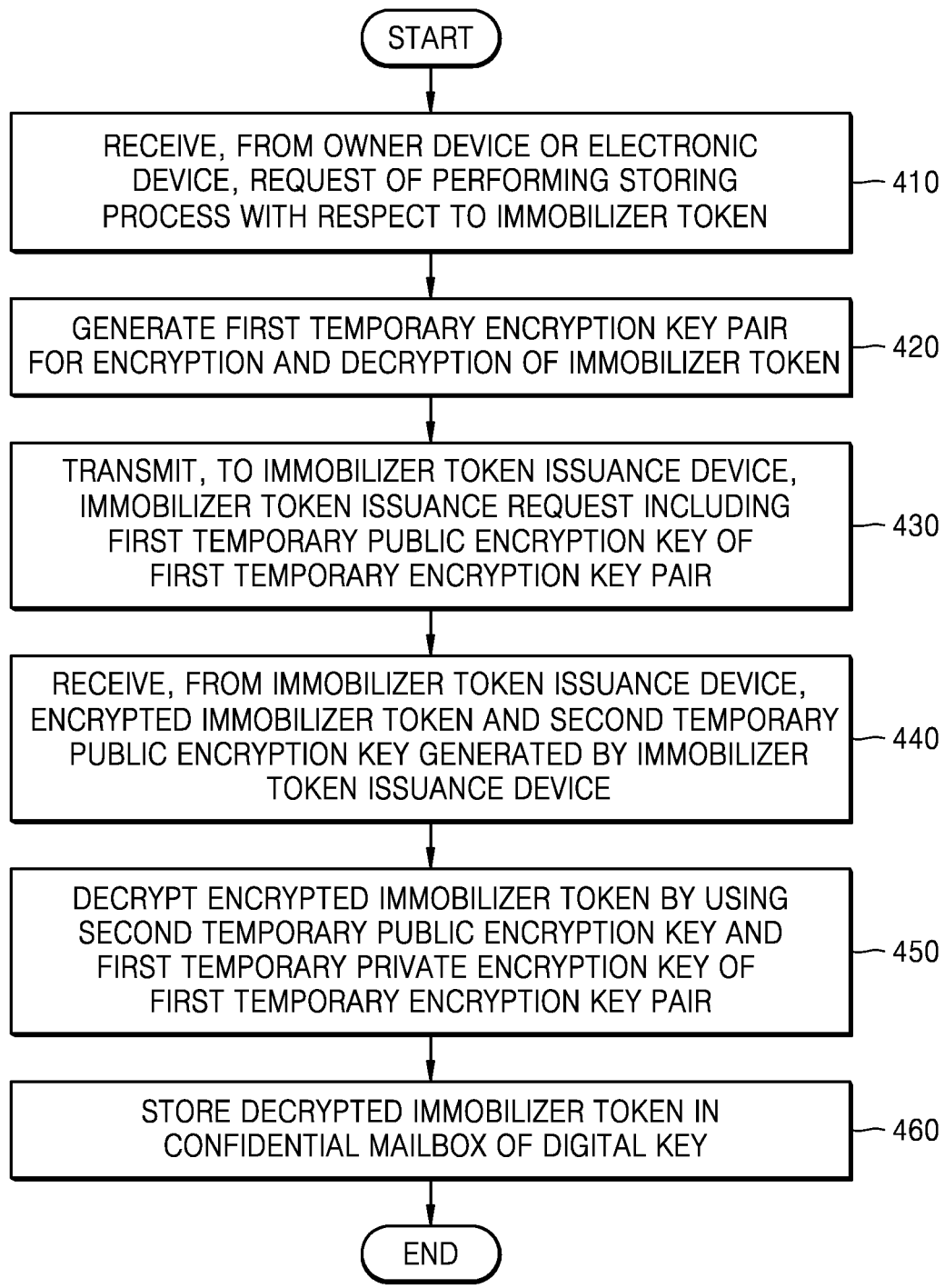
FIG. 4 is a flowchart of an operating method of the target device for updating an immobilizer token according to an embodiment.
Figure 5:
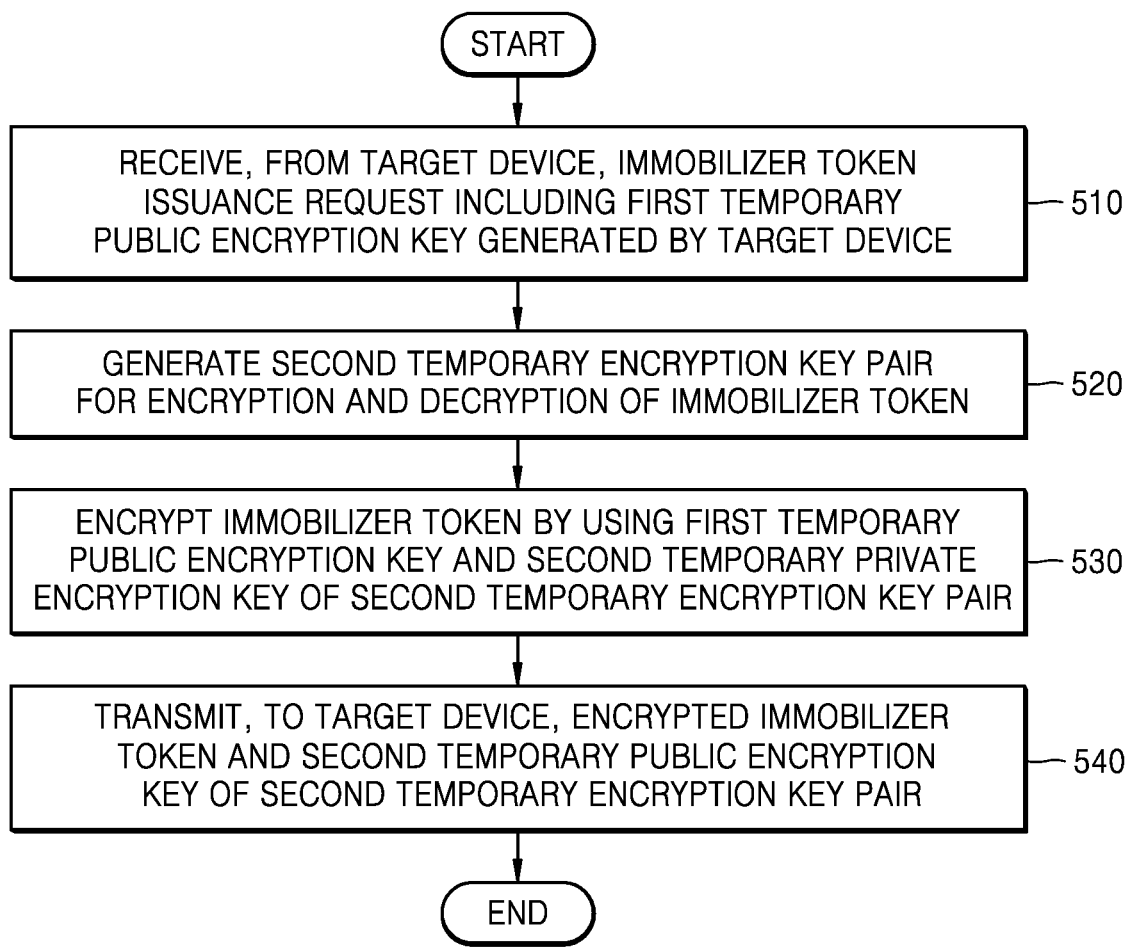
FIG. 5 is a flowchart of an operating method of the immobilizer token issuance device for updating an immobilizer token according to an embodiment.
Figure 6:
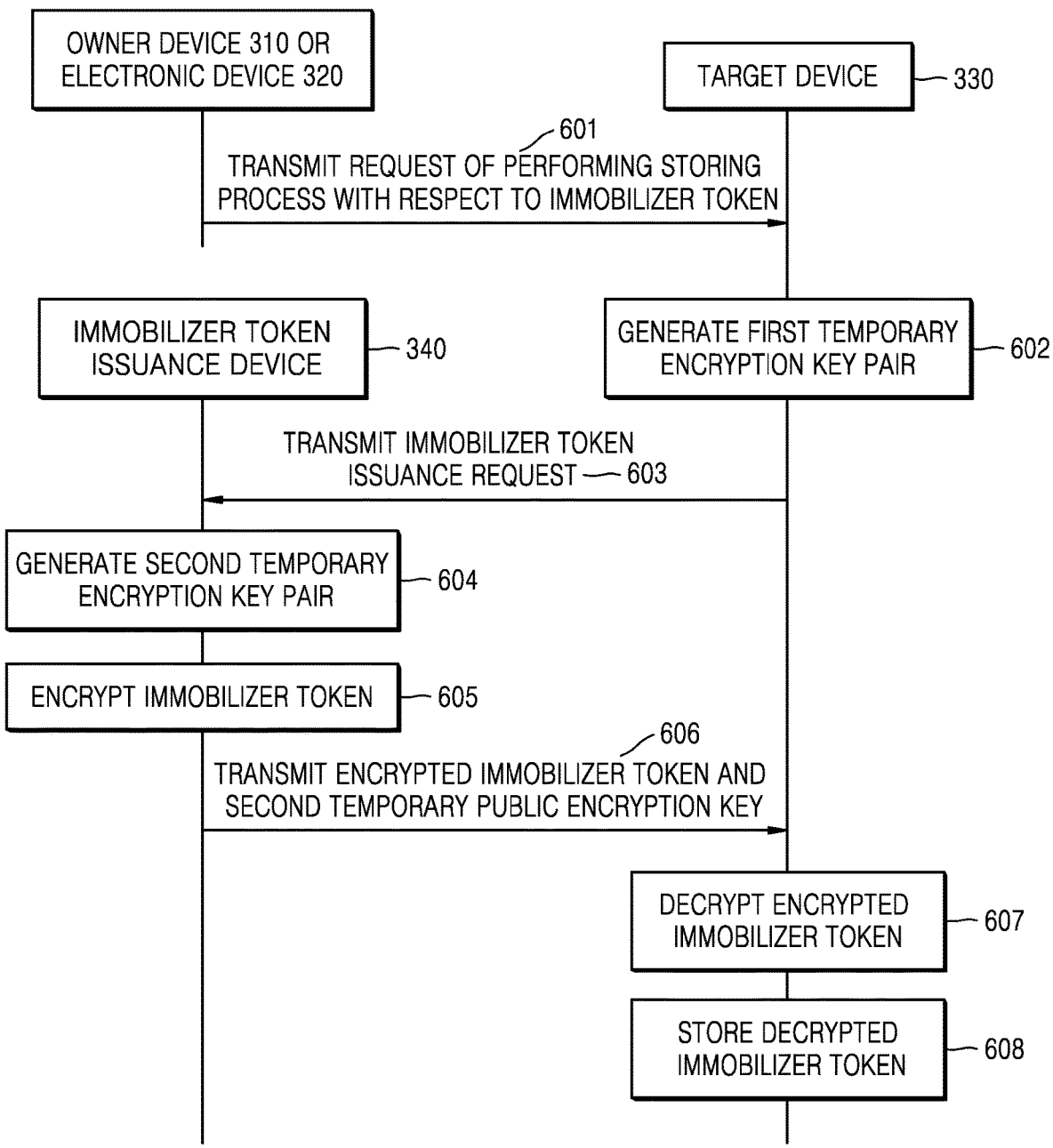
FIG. 6 is a signal flowchart between the target device and the immobilizer token issuance device, for an update of an immobilizer token according to an embodiment.

FIGS. 4 to 6 are diagrams illustrating a method by which a target device is issued an immobilizer token from an immobilizer token issuance device and stores the immobilizer token so as to update the immobilizer token, according to an embodiment.

FIG. 4 is a flowchart of an operating method of the target device for updating an immobilizer token according to an embodiment. Operations of FIG. 4 may be operations of the target device which correspond to operations of the immobilizer token issuance device of FIG. 5.

In operation 410, the target device 330 may receive, from the owner device 310 or the electronic device 320, a request of performing a storing process with respect to an immobilizer token.

According to an embodiment, when the target device 330 receives the request of performing a storing process with respect to an immobilizer token, the target device 330 may start a process of being issued and storing an immobilizer token so as to update the immobilizer token.

According to an embodiment, without involvement by the electronic device 320, the target device 330 may directly receive, from the owner device 310, the request of performing the storing process with respect to an immobilizer token. In this case, the target device 330 may start the process of storing the immobilizer token by being issued the immobilizer token from the owner device 310.

According to an embodiment, the target device 330 may receive, from the electronic device 320, a request of performing a storing process with respect to an immobilizer token. The request of performing the storing process with respect to an immobilizer token received from the electronic device 320 may be based on immobilizer token update information transmitted to the electronic device 320 from a server that provides a service related to the owner device 310 and the electronic device 320. The request of performing the storing process with respect to an immobilizer token received from the electronic device 320 may be information including the immobilizer token update information which indicates necessity for issuance of an immobilizer token.

In operation 420, the target device 330 may generate a first temporary encryption key pair for encryption and decryption of an immobilizer token.

According to an embodiment, the target device 330 may generate the first temporary encryption key pair for accessing a confidential mailbox so as to be issued a new immobilizer token and store the new immobilizer token in the confidential mailbox of a digital key. The first temporary encryption key pair may be generated in a secure element of the target device 330.

The first temporary encryption key pair may include a first temporary public encryption key (Friend.Enc.ePK) for encryption of the immobilizer token. Also, the first temporary encryption key pair may include a first temporary private encryption key (Friend.Enc.eSK) for decryption of the immobilizer token. The immobilizer token may be encrypted by using the first temporary public encryption key (Friend.Enc.ePK) of the target device 330 and a second temporary private encryption key (sender.Enc.eSK) generated by the immobilizer token issuance device 340. The encrypted immobilizer token may be decrypted by using the first temporary private encryption key (Friend.Enc.eSK) of the target device 330 and a second temporary public encryption key (sender.Enc.ePK) generated by the immobilizer token issuance device 340.

In operation 430, the target device 330 may transmit, to the immobilizer token issuance device 340, an immobilizer token issuance request including the first temporary public encryption key of the first temporary encryption key pair.

The immobilizer token issuance request may be information for requesting the immobilizer token issuance device 340 to issue the immobilizer token for an update of the immobilizer token.

According to an embodiment, the first temporary public encryption key (Friend.Enc.ePK) included in the immobilizer token issuance request may be included, in the form of an attestation, in an encryption key attestation, and transmitted. The encryption key attestation (also referred to as ency.Key attestation) including the first temporary public encryption key (Friend.Enc.ePK) may be an attestation for authenticating that the first temporary encryption key is for an access to the confidential mailbox of the digital key. The encryption key attestation may include a value obtained by signing the first temporary public encryption key (Friend.Enc.ePK) with a private key (Friend.DK.SK) of the target device 330.

In operation 440, the target device 330 may receive, from the immobilizer token issuance device 340, the encrypted immobilizer token and a second temporary public encryption key generated by the immobilizer token issuance device 340.

According to an embodiment, the encrypted immobilizer token may have been encrypted by the immobilizer token issuance device 340 by using the first temporary public encryption key (Friend.Enc.ePK) and the second temporary private encryption key (sender.Enc.eSK) generated by the immobilizer token issuance device 340. In detail, the immobilizer token may be encrypted by using a symmetric key calculated by the immobilizer token issuance device 340 by using the first temporary public encryption key (Friend.Enc.ePK) and the second temporary private encryption key (sender.Enc.eSK). To calculate the symmetric key, an algorithm such as elliptic-curve Diffie-Hellman (ECDH) may be used.

In operation 450, the target device 330 may decrypt the encrypted immobilizer token by using the second temporary public encryption key and the first temporary private encryption key of the first temporary encryption key pair.

According to an embodiment, the target device 330 may calculate a symmetric key by using the first temporary private encryption key (Friend.Enc.eSK) and the second temporary public encryption key (sender.Enc.ePK). The calculated symmetric key may be identical to the symmetric key calculated by the immobilizer token issuance device 340 by using the first temporary public encryption key (Friend.Enc.ePK) and the second temporary private encryption key (sender.Enc.eSK). The target device 330 may decrypt the encrypted immobilizer token by using the calculated symmetric key.

In operation 460, the target device 330 may store the decrypted immobilizer token in the confidential mailbox of the digital key.

According to an embodiment, when the encrypted immobilizer token is successfully decrypted, the target device 330 may store the decrypted immobilizer token in the confidential mailbox of the digital key.

FIG. 5 is a flowchart of an operating method of the immobilizer token issuance device for updating an immobilizer token according to an embodiment. Operations of FIG. 5 may be operations of the immobilizer token issuance device which correspond to operations of the target device of FIG. 4.

In operation 510, the immobilizer token issuance device 340 may receive, from the target device 330, a request of issuing an immobilizer token including a first temporary public encryption key generated by the target device 330.

According to an embodiment, the immobilizer token issuance device 340 may include a service provision server related to the owner device 310 or the electronic device 320.

According to an embodiment, a first temporary public encryption key (Friend.Enc.ePK) may be one of a first temporary public encryption key pair generated by the target device 330 so as to access a confidential mailbox of a digital key for an update of an immobilizer token.

According to an embodiment, the first temporary public encryption key (Friend.Enc.ePK) may be included, in the form of an attestation, in attestation, and transmitted. The encryption key attestation (also referred to as ency.Key attestation) including the first temporary public encryption key (Friend.Enc.ePK) may be an attestation for authenticating that the first temporary encryption key is for an access to the confidential mailbox of the digital key. The encryption key attestation may include a value obtained by signing the first temporary public encryption key (Friend.Enc.ePK) with a private key (Friend.DK.SK) of the target device 330.

According to an embodiment, when the immobilizer token issuance device 340 receives a request of issuing an immobilizer token, the immobilizer token issuance device 340 may start an update of the immobilizer token, i.e., a process for issuing a new immobilizer token. The immobilizer token to be issued by the immobilizer token issuance device 340 may be an immobilizer token corresponding to the request of performing the storing process with respect to an immobilizer token, the request being received by the target device 330 in operation 410 of FIG. 4.

In operation 520, the immobilizer token issuance device 340 may generate a second temporary encryption key pair for encryption and decryption of an immobilizer token.

According to an embodiment, to issue the new immobilizer token to be stored in the confidential mailbox of a digital key of the target device 330, the immobilizer token issuance device 340 may generate the second temporary encryption key pair for an access to a confidential mailbox.

According to an embodiment, the second temporary encryption key pair may include the second temporary private encryption key (sender.Enc.eSK) for encryption of an immobilizer token. Also, the first temporary encryption key pair may include the second temporary public encryption key (sender.Enc.ePK) for decryption of the immobilizer token.

In operation 530, the immobilizer token issuance device 340 may encrypt the immobilizer token by using the first temporary public encryption key and the second temporary private encryption key of the second temporary encryption key pair.

According to an embodiment, the immobilizer token issuance device 340 may calculate a symmetric key by using the first temporary public encryption key (Friend.Enc.ePK) of the target device 330 and the second temporary private encryption key (sender.Enc.eSK). The calculated symmetric key may be identical to the symmetric key for decryption of the immobilizer token, which is calculated by the target device 330 by using the first temporary private encryption key (Friend.Enc.eSK) and the second temporary public encryption key (sender.Enc.ePK). The immobilizer token issuance device 340 may encrypt the immobilizer token by using the calculated symmetric key.

According to an embodiment, the encrypted immobilizer token that is the immobilizer token issued by the immobilizer token issuance device 340 may be an immobilizer token corresponding to the request of performing the storing process with respect to an immobilizer token, the request being received by the target device 330 in operation 410 of FIG. 4.

According to an embodiment, the encrypted immobilizer token may be decrypted by the target device 330 by using the first temporary private encryption key (Friend.Enc.eSK) and the second temporary public encryption key (sender.Enc.ePK).

In operation 540, the immobilizer token issuance device 340 may transmit, to the target device 330, the encrypted immobilizer token and the second temporary public encryption key of the second temporary encryption key pair.

FIG. 6 is a signal flowchart between the target device and the immobilizer token issuance device, for an update of an immobilizer token according to an embodiment. FIG. 6 is a diagram of the signal flowchart which corresponds to the operations of the target device 330 of FIG. 4 and the operations of the immobilizer token issuance device 340 of FIG. 5.

In operation 601, the owner device 310 or the electronic device 320 may transmit, to the target device 330, a request of performing a storing process with respect to an immobilizer token. Operation 601 may correspond to operation 410 of FIG. 4.

In operation 602, the target device 330 may generate a first temporary encryption key pair. Operation 602 may correspond to operation 420 of FIG. 4.

In operation 603, the target device 330 may transmit a request of issuing an immobilizer token to the immobilizer token issuance device 340. Operation 603 may correspond to operation 430 of FIG. 4 and operation 510 of FIG. 5.

In operation 604, the immobilizer token issuance device 340 may generate a second temporary encryption key pair. Operation 604 may correspond to operation 520 of FIG. 5.

In operation 605, the immobilizer token issuance device 340 may encrypt an immobilizer token. Operation 605 may correspond to operation 530 of FIG. 5.

In operation 606, the immobilizer token issuance device 340 may transmit the encrypted immobilizer token and a second temporary public encryption key to the target device 330. Operation 606 may correspond to operation 440 of FIG. 4 and operation 540 of FIG. 5.

In operation 607, the target device 330 may decrypt the encrypted immobilizer token. Operation 607 may correspond to operation 450 of FIG. 4.

In operation 608, the target device 330 may store the decrypted immobilizer token. Operation 608 may correspond to operation 460 of FIG. 4.

Figure 7:
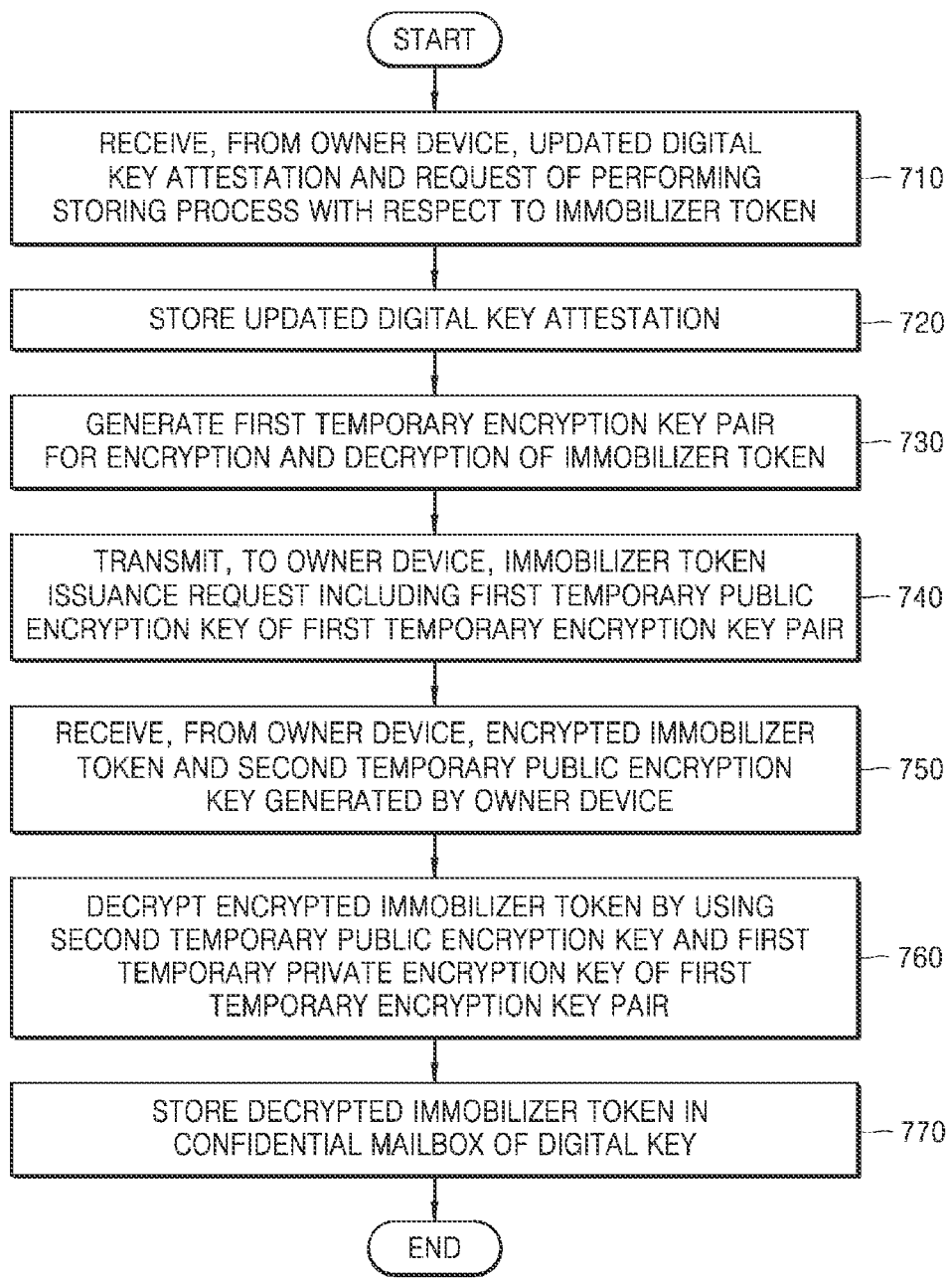
FIG. 7 is a flowchart of an operating method of the target device that is directly issued an immobilizer token from the owner device so as to update the immobilizer token according to an embodiment.

FIGS. 7 to 9 illustrate an embodiment of a method by which, to update an immobilizer token, the owner device 310 does not use the electronic device 320 but directly issues the immobilizer token and transmits the immobilizer token to the target device 330 so as to update the immobilizer token. In FIGS. 7 to 9, the owner device 310 may perform a function of the immobilizer token issuance device 340 in FIGS. 4 to 6.

FIG. 7 is a flowchart of an operating method of the target device that is directly issued an immobilizer token from the owner device so as to update the immobilizer token according to an embodiment. Operations of FIG. 7 may be operations of the target device 330 which correspond to operations of the owner device 310 of FIG. 8. Hereinafter, in descriptions about FIG. 7, operations overlapping afore-described operations of FIG. 4 will be briefly described.

In operation 710, the target device 330 may receive, from the owner device 310, an updated digital key attestation and a request of performing a storing process with respect to an immobilizer token.

According to an embodiment, the target device 330 may receive the request of performing the storing process with respect to an immobilizer token along with the digital key attestation indicating an updated entitlement of a digital key. In this regard, the updated entitlement of the digital key may include entitlements of the digital key (e.g., to curtail/extend a validation period, to grant authority to start a vehicle, etc.). In this regard, some entitlements of the digital key may not be updated by only the digital key attestation but may require issuance of or a change in an immobilizer token. The updated digital key attestation may be generated by the owner device 310. Information including the updated digital key attestation and the request of performing the storing process with respect to an immobilizer token may be referred to as a digital key entitlement update request.

According to an embodiment, the updated digital key attestation may include a public key of the target device 330, updated entitlement information of the digital key, and a signature of the owner device 310.

According to an embodiment, the target device 330 may receive, from the owner device 310, only one of the updated digital key attestation and the request of performing the storing process with respect to an immobilizer token. For example, when an update of the immobilizer token is not necessary to update the entitlement of the digital key, the owner device 310 may not transmit, to the target device 330, the request of performing the storing process with respect to an immobilizer token. In this case, the target device 330 may receive only the updated digital key attestation, and may not perform operations 730 to 770.

In operation 720, the target device 330 may store the updated digital key attestation.

According to an embodiment, the target device 330 may store the updated digital key attestation, and then may transmit the stored updated digital key attestation to the electronic device 320 at a later time for communication with the electronic device 320. The transmitted updated digital key attestation may be verified and applied by the electronic device 320.

In operation 730, the target device 330 may generate a first temporary encryption key pair for encryption and decryption of the immobilizer token.

In operation 740, the target device 330 may transmit, to the owner device 310, a request of issuing an immobilizer token including a first temporary public encryption key of the first temporary encryption key pair.

In operation 750, the target device 330 may receive, from the owner device 310, an encrypted immobilizer token and a second temporary public encryption key generated by the owner device 310.

In operation 760, the target device 330 may decrypt the encrypted immobilizer token by using the second temporary public encryption key and the first temporary private encryption key of the first temporary encryption key pair.

In operation 770, the target device 330 may store the decrypted immobilizer token in a confidential mailbox of a digital key.

FIG. 8 is a flowchart of an operating method of the owner device that directly issues an immobilizer token to the target device so as to update the immobilizer token according to an embodiment. Operations of FIG. 8 may be operations of the owner device 310 which correspond to operations of the target device 330 of FIG. 7. Hereinafter, in descriptions about FIG. 8, operations overlapping afore-described operations of FIG. 5 will be briefly described.

In operation 810, the owner device 310 may generate an updated digital key attestation.

According to an embodiment, the owner device 310 may generate a digital key attestation to update an entitlement of a digital key of the target device 330. The updated digital key attestation may include a public key of the target device 330, updated entitlement information of the digital key, and a signature of the owner device 310.

In this regard, the updated entitlement of the digital key may include entitlements of the digital key (e.g., to curtail/extend a validation period, to grant authority to start a vehicle, etc.). In this regard, some entitlements of the digital key may not be executed by only the digital key attestation but may require issuance of or a change in an immobilizer token.

In operation 820, the owner device 310 may transmit, to the target device 330, the updated digital key attestation and a request of performing a storing process with respect to an immobilizer token.

According to an embodiment, the owner device 310 may transmit, to the target device 330, the digital key attestation indicating the updated entitlement of the digital key along with the request of performing the storing process with respect to an immobilizer token. Information including the updated digital key attestation and the request of performing the storing process with respect to an immobilizer token, the information being transmitted by the owner device 310, may be referred to as a digital key entitlement update request.

According to an embodiment, the owner device 310 may transmit, to the target device 330, only one of the updated digital key attestation and the request of performing the storing process with respect to an immobilizer token. For example, when an update of the immobilizer token is not necessary to update the entitlement of the digital key, the owner device 310 may not transmit, to the target device 330, the request of performing the storing process with respect to an immobilizer token. In this case, the immobilizer token storing process may not be performed in the target device 330, and the owner device 310 may not perform operations 830 to 860.

In operation 830, the owner device 310 may receive, from the target device 330, a request of issuing an immobilizer token including a first temporary public encryption key generated by the target device 330.

In operation 840, the owner device 310 may generate a second temporary encryption key pair for encryption and decryption of the immobilizer token.

In operation 850, the owner device 310 may encrypt the immobilizer token by using the first temporary public encryption key and a second temporary private encryption key of the second temporary encryption key pair.

In operation 860, the owner device 310 may transmit, to the target device 330, the encrypted immobilizer token and a second temporary public encryption key of the second temporary encryption key pair.

Figure 9A:
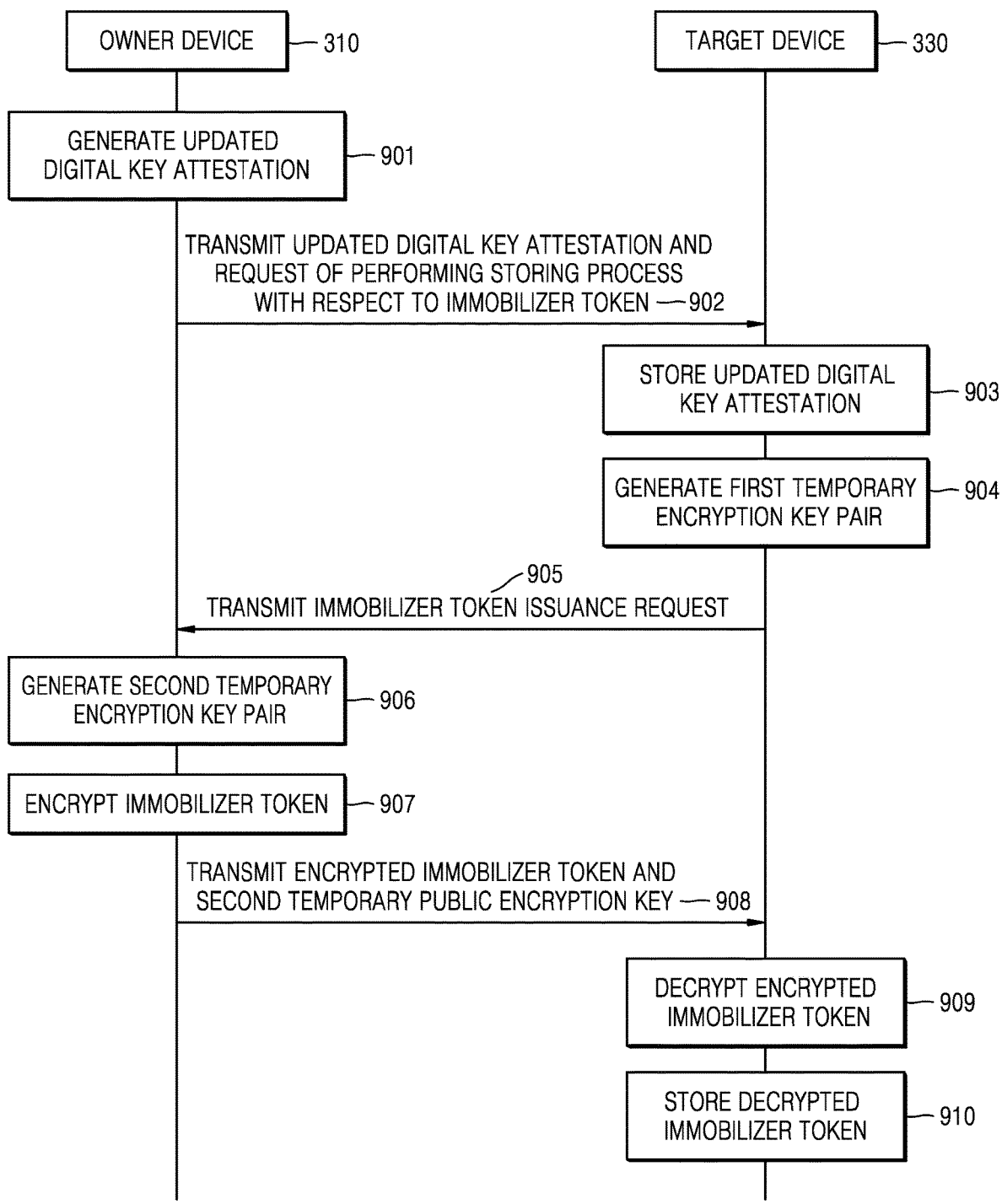
FIG. 9A is a signal flowchart between the owner device and the target device, for an update of an immobilizer token according to an embodiment.

FIG. 9A is a signal flowchart between the owner device and the target device, for an update of an immobilizer token according to an embodiment. FIG. 9A is a diagram of the signal flowchart which corresponds to the operations of the target device of FIG. 7 and the operations of the owner device of FIG. 8.

In operation 901, the owner device 310 may generate an updated digital key attestation. Operation 901 may correspond to operation 810 of FIG. 8.

In operation 902, the owner device 310 may transmit, to the target device 330, the updated digital key attestation and a request of performing a storing process with respect to an immobilizer token. Operation 902 may correspond to operation 710 of FIG. 7 and operation 820 of FIG. 8.

In operation 903, the target device 330 may store the updated digital key attestation. Operation 903 may correspond to operation 720 of FIG. 7.

In operation 904, the target device 330 may generate a first temporary encryption key pair. Operation 904 may correspond to operation 730 of FIG. 7.

In operation 905, the target device 330 may transmit a request of issuing an immobilizer token to the owner device 310. Operation 905 may correspond to operation 740 of FIG. 7 and operation 830 of FIG. 8.

In operation 906, the owner device 310 may generate a second temporary encryption key pair. Operation 906 may correspond to operation 840 of FIG. 8.

In operation 907, the owner device 310 may encrypt an immobilizer token. Operation 907 may correspond to operation 850 of FIG. 8.

In operation 908, the owner device 310 may transmit the encrypted immobilizer token and a second temporary public encryption key. Operation 908 may correspond to operation 750 of FIG. 7 and operation 860 of FIG. 7.

In operation 909, the target device 330 may decrypt the encrypted immobilizer token. Operation 909 may correspond to operation 760 of FIG. 7.

In operation 910, the target device 330 may store the decrypted immobilizer token. Operation 910 may correspond to operation 770 of FIG. 7.

Figure 9B:
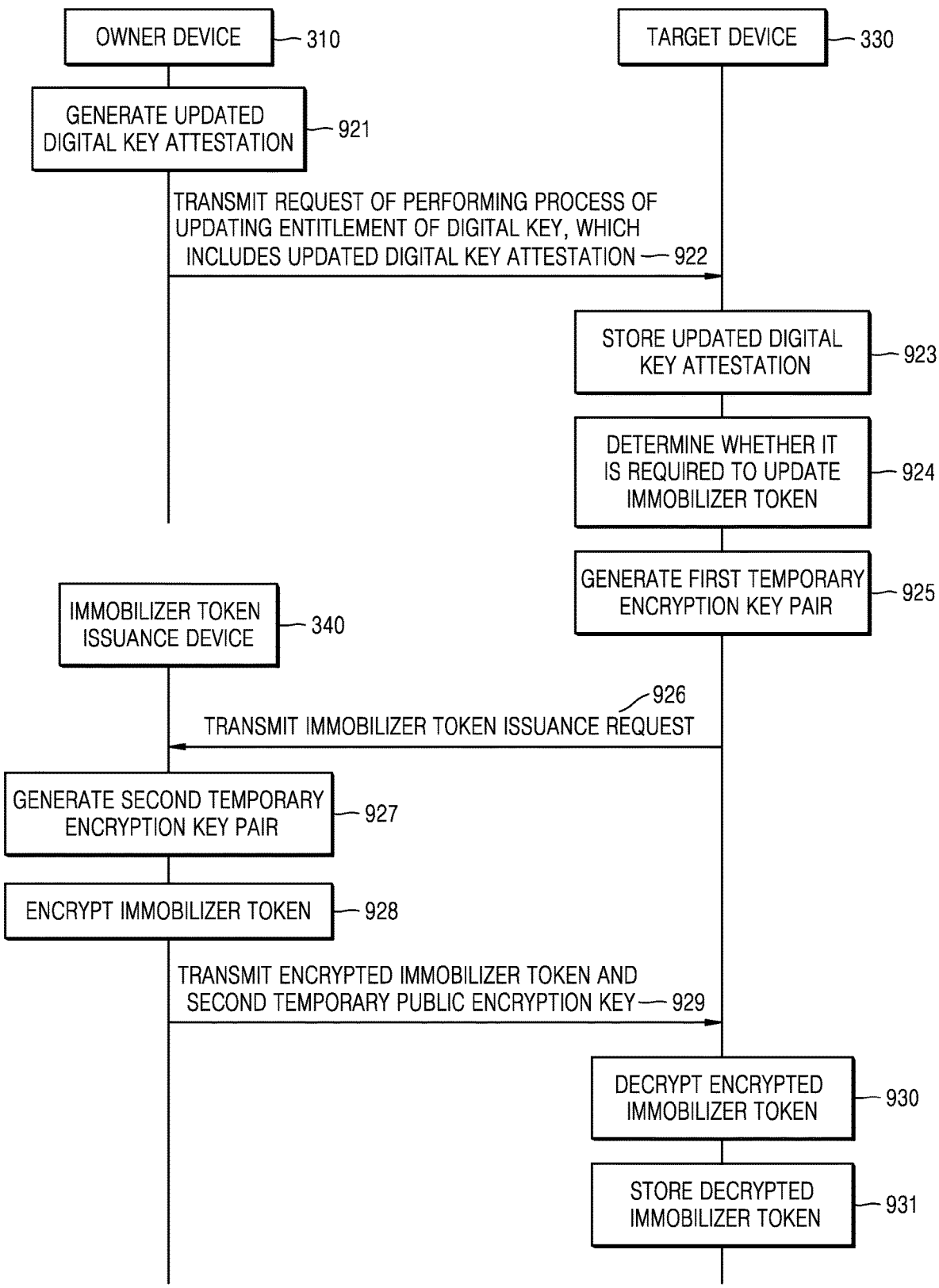
FIG. 9B is a signal flowchart among the owner device, the target device, and the immobilizer token issuance device, for an update of an immobilizer token, according to an embodiment.

FIG. 9B is a signal flowchart among the owner device, the target device, and the immobilizer token issuance device, for an update of an immobilizer token, according to an embodiment. Unlike to the embodiments of FIGS. 7 to 9A, the embodiment of FIG. 9B may correspond to a case in which an explicit request of an immobilizer token storing process with respect to the target device 330 is not present.

In operation 921, the owner device 310 may generate an updated digital key attestation. Operation 921 may correspond to operation 901 of FIG. 9A.

In operation 922, the owner device 310 may transmit a request of performing a process of updating an entitlement of a digital key including the updated digital key attestation, to the target device 330.

According to an embodiment, the updated digital key attestation may indicate an updated entitlement of a digital key. For example, the updated digital key attestation may include updated entitlement information of the digital key. In this regard, the updated entitlement of the digital key may include entitlements of the digital key (e.g., to curtail/extend a validation period, to grant authority to start a vehicle, etc.).

In operation 923, the target device 330 may store the updated digital key attestation. Operation 923 may correspond to operation 903 of FIG. 9A.

In operation 924, the target device 330 may determine whether it is required to update an immobilizer token.

According to an embodiment, the target device 330 may determine whether it is required to update the immobilizer token, based on the updated entitlement information included in the updated digital key attestation. For example, the target device 330 may identify whether the updated entitlement information includes update information about some entitlements of the immobilizer token which require an update. When the updated entitlement information includes update information about some entitlements of the digital key, the target device 330 may identify whether the target device 330 stores an immobilizer token corresponding to some entitlements of the digital key which require an update. The target device 330 may determine whether it is required to update the immobilizer token, based on a storage situation of the immobilizer token. For example, in a case where the immobilizer token corresponding to some entitlements which require an update is not stored in the confidential mailbox, the target device 330 may determine that issuance of a changed immobilizer token or a new immobilizer token which corresponds to some entitlements requiring an update.

In operation 925, the target device 330 may generate a first temporary encryption key pair.

According to an embodiment, only when the target device 330 determines that the update of the immobilizer token is required in operation 924, the target device 330 may generate the first temporary encryption key pair. When the target device 330 determines that the update of the immobilizer token is not required in operation 924, the target device 330 may not perform operations 924 to 931 for the update of the immobilizer token.

In operation 926, the target device 330 may transmit a request of issuing an immobilizer token to the immobilizer token issuance device 340. Operation 926 may correspond to operation 603 of FIG. 6.

According to an embodiment, the immobilizer token issuance device 340 may be the owner device 310. In a case where the immobilizer token issuance device 340 is the owner device 310, operation 926 may correspond to operation 906 of FIG. 9A, and operations 927 to 931 may correspond to operations 907 to 910 of FIG. 9A.

According to an embodiment, the immobilizer token issuance device 340 may be a service provision server related to the electronic device 320. In this regard, the service provision server related to the electronic device 320 may include a server of an OEM (e.g., a vehicle manufacturer, etc.) manufactured the electronic device 320, a server of another service provider providing a service to the electronic device 320, or the like.

In operation 927, the immobilizer token issuance device 340 may generate a second temporary encryption key pair. Operation 927 may correspond to operation 604 of FIG. 6.

In operation 928, the immobilizer token issuance device 340 may encrypt the immobilizer token. Operation 928 may correspond to operation 605 of FIG. 6.

In operation 929, the immobilizer token issuance device 340 may transmit the encrypted immobilizer token and a second temporary public encryption key. Operation 929 may correspond to operation 606 of FIG. 6.

In operation 930, the target device 330 may decrypt the encrypted immobilizer token. Operation 930 may correspond to operation 607 of FIG. 6.

In operation 931, the target device 330 may store the decrypted immobilizer token. Operation 931 may correspond to operation 608 of FIG. 7.

Figure 10:
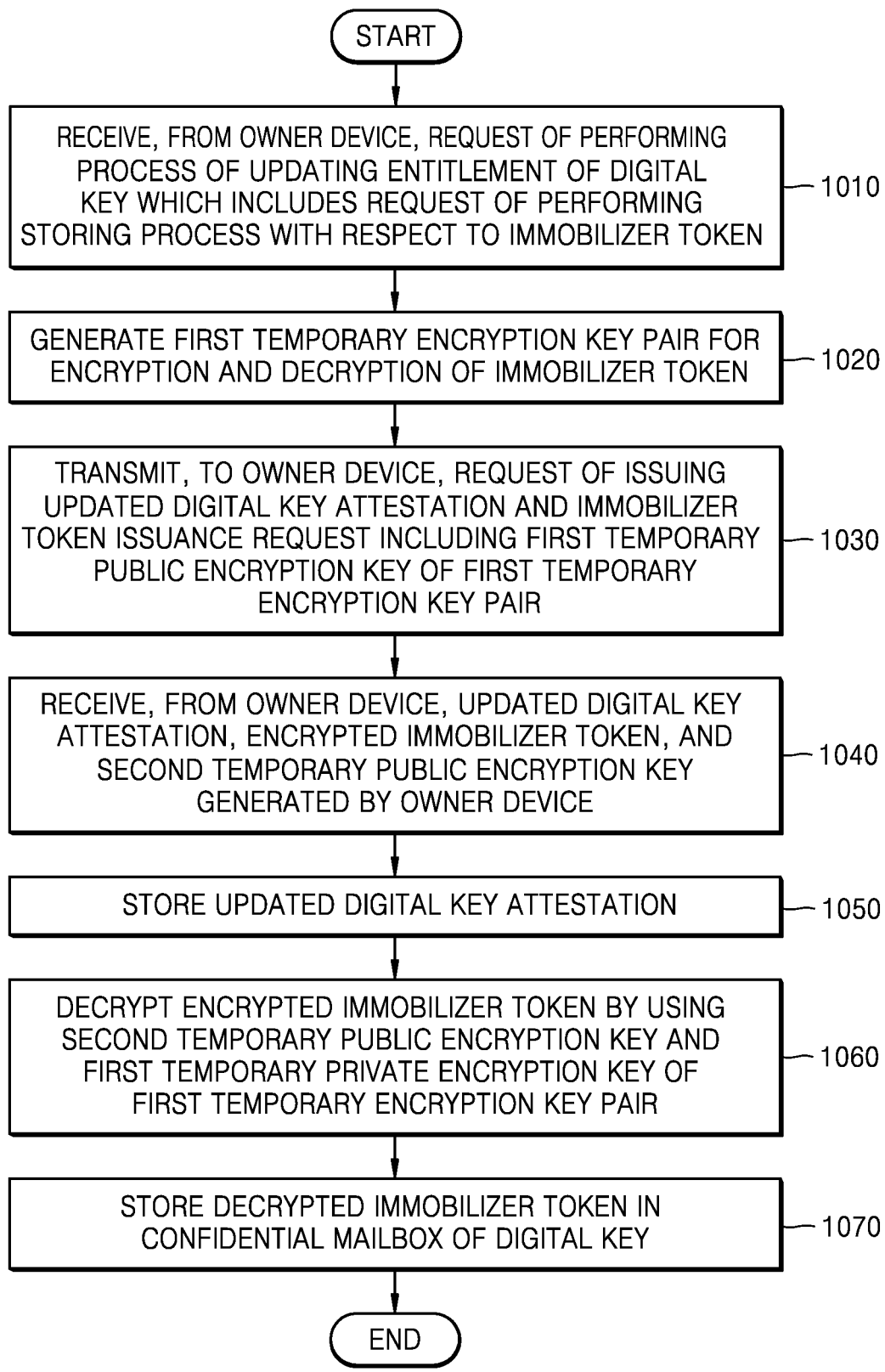
FIG. 10 is a flowchart of an operating method of the target device that is directly issued an immobilizer token from the owner device so as to update the immobilizer token according to an embodiment.
Figure 11:
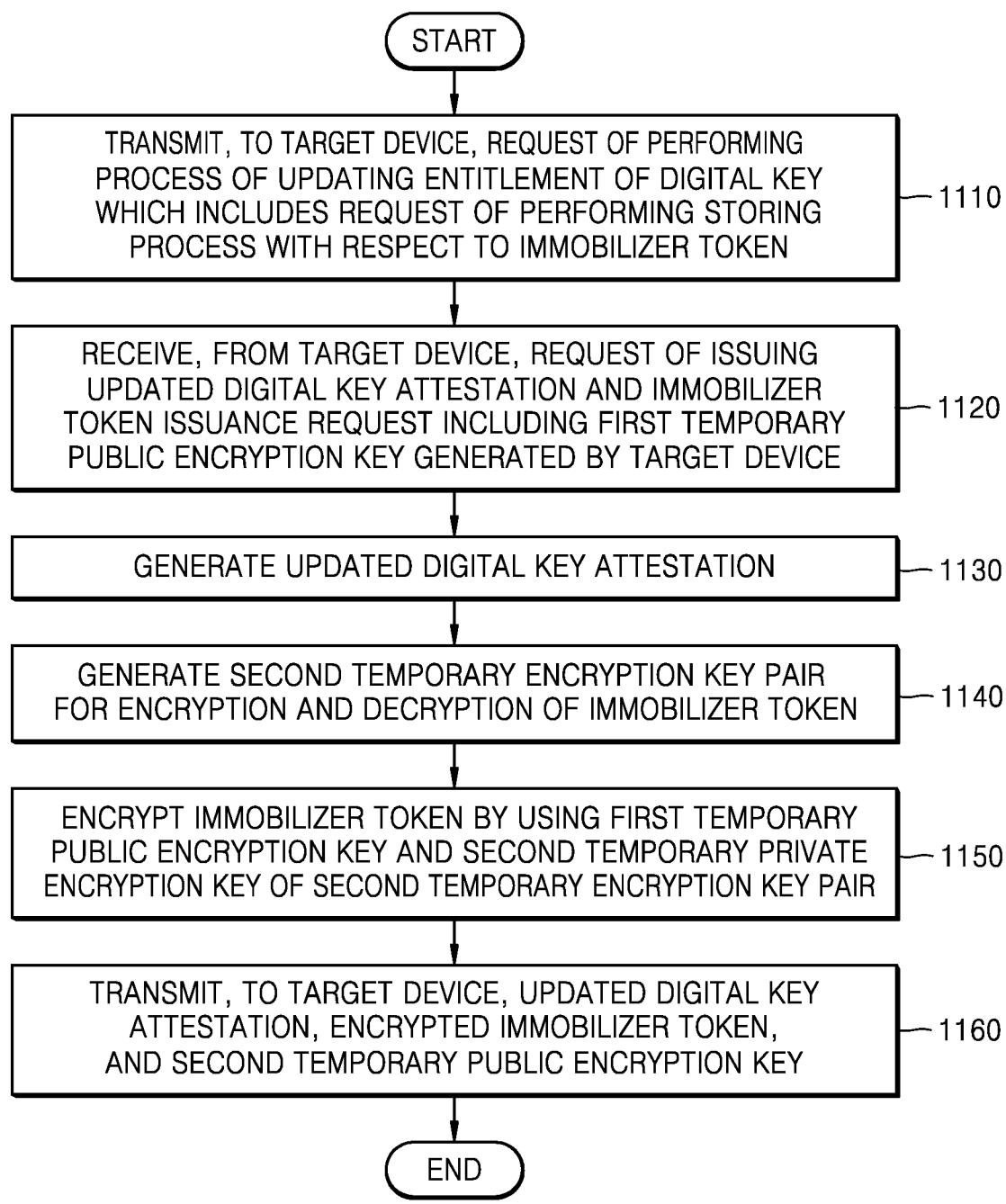
FIG. 11 is a flowchart of an operating method of the owner device that directly issues an immobilizer token to the target device so as to update the immobilizer token according to an embodiment.
Figure 12:
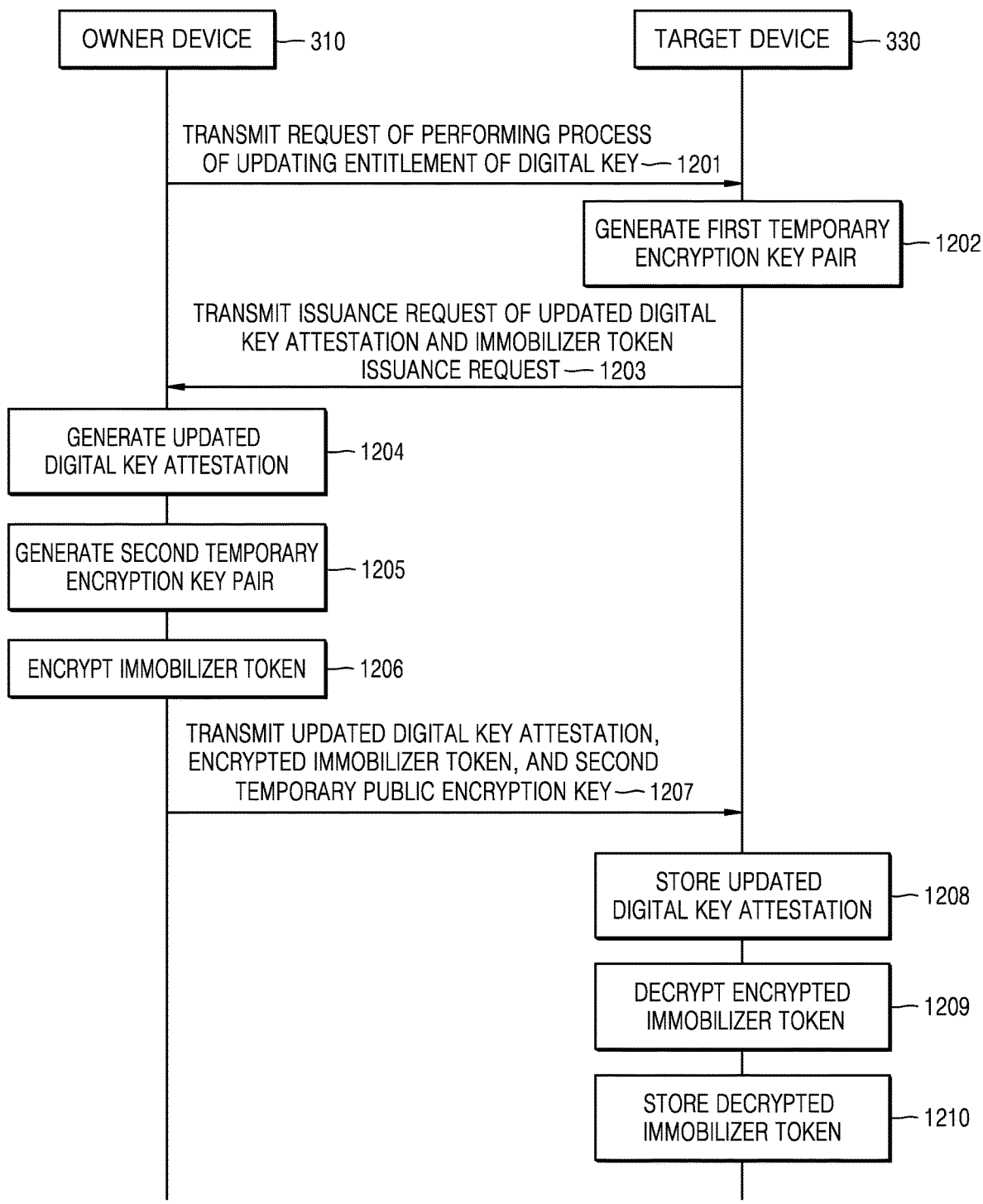
FIG. 12 is a signal flowchart between the owner device and the target device, for an update of an immobilizer token according to an embodiment.

FIGS. 10 to 12 illustrate another embodiment of a method by which, to update an immobilizer token, the owner device 310 does not use the electronic device 320 but directly issues the immobilizer token and transmits the immobilizer token to the target device 330 so as to update the immobilizer token. In FIGS. 10 to 12, the owner device 310 may perform a function of the immobilizer token issuance device 340 in FIGS. 4 to 6.

FIG. 10 is a flowchart of an operating method of the target device that is directly issued an immobilizer token from the owner device so as to update the immobilizer token according to an embodiment. Operations of FIG. 10 may be operations of the target device 330 which correspond to operations of the owner device 310 of FIG. 11. Hereinafter, in descriptions about FIG. 10, operations overlapping aforedescribed operations of FIG. 4 will be briefly described.

In operation 1010, the target device 330 may receive, from the owner device 310, a request of performing a process of updating an entitlement of a digital key which includes a request of performing a storing process with respect to an immobilizer token.

According to an embodiment, the request of performing the process of updating the entitlement of the digital key (entitlement update invitation) may be information by which the owner device 310 indicates, to the target device 330, a start of the digital key entitlement updating process. The request of performing the process of updating the entitlement of the digital key may include information about whether an update of a digital key attestation is required. The request of performing the process of updating the entitlement of the digital key may include an identifier (ID) of a digital key to be updated, information about an entitlement to be updated, and the like.

In operation 1020, the target device 330 may generate a first temporary encryption key pair for encryption and decryption of an immobilizer token.

According to an embodiment, the target device 330 may generate the first temporary encryption key pair, in response to the request of performing a storing process with respect to an immobilizer token.

In operation 1030, the target device 330 may transmit, to the owner device 310, a request of issuing an updated digital key attestation and a request of issuing an immobilizer token including a first temporary public encryption key of the first temporary encryption key pair.

According to an embodiment, the target device 330 may transmit the immobilizer token issuance request along with the request of issuing an updated digital key attestation indicating an updated entitlement of a digital key. The target device 330 may transmit the request of issuing an updated digital key attestation to the owner device 310, based on information included in the request of performing the process of updating the entitlement of the digital key.

In operation 1040, the target device 330 may receive, from the owner device 310, the updated digital key attestation, an encrypted immobilizer token, and a second temporary public encryption key generated by the owner device 310.

According to an embodiment, the received updated digital key attestation may be a digital key attestation generated by the owner device 310 in response to the request of issuing the updated digital key attestation.

According to an embodiment, the updated digital key attestation may include a public key of the target device 330, updated entitlement information of the digital key, and a signature of the owner device 310.

In operation 1050, the target device 330 may store the updated digital key attestation.

According to an embodiment, the target device 330 may store the updated digital key attestation, and then may transmit the stored updated digital key attestation to the electronic device 320 via communication with the electronic device 320. The transmitted updated digital key attestation may be verified and applied by the electronic device 320.

In operation 1060, the target device 330 may decrypt the encrypted immobilizer token by using the second temporary public encryption key and the first temporary private encryption key of the first temporary encryption key pair.

In operation 1070, the target device 330 may store the decrypted immobilizer token in a confidential mailbox of the digital key.

FIG. 11 is a flowchart of an operating method of the owner device that directly issues an immobilizer token to the target device so as to update the immobilizer token according to an embodiment. Operations of FIG. 11 may be operations of the owner device 310 which correspond to operations of the target device 330 of FIG. 10. Hereinafter, in descriptions about FIG. 11, operations overlapping afore-described operations of FIG. 5 will be briefly described.

In operation 1110, the owner device 310 may transmit, to the target device 330, a request of performing a process of updating an entitlement of a digital key which includes a request of performing a storing process with respect to an immobilizer token.

According to an embodiment, the owner device 310 may indicate a start of the digital key entitlement updating process by transmitting, to the target device 330, the request of performing the process of updating the entitlement of the digital key (entitlement update invitation). The request of performing the process of updating the entitlement of the digital key may include information about whether an update of a digital key attestation is required. The request of performing the process of updating the entitlement of the digital key may include an ID of a digital key to be updated, information about an entitlement to be updated, and the like.

In operation 1120, the owner device 310 may receive, from the target device 330, a request of issuing an updated digital key attestation and a request of issuing an immobilizer token including a first temporary public encryption key generated by the target device.

According to an embodiment, the owner device 310 may receive the immobilizer token issuance request along with the request of issuing an updated digital key attestation indicating an updated entitlement of a digital key. The request of issuing an updated digital key attestation may be based on information included in a request of performing a process of updating an entitlement of a digital key.

In operation 1130, the owner device 310 may generate an updated digital key attestation.

According to an embodiment, the owner device 310 may generate the updated digital key attestation, in response to the request of issuing the updated digital key attestation. The updated digital key attestation may include a public key of the target device 330, updated entitlement information of the digital key, and a signature of the owner device 310.

In operation 1140, the owner device 310 may generate a second temporary encryption key pair for encryption and decryption of an immobilizer token.

In operation 1150, the owner device 310 may encrypt the immobilizer token by using the first temporary public encryption key and a second temporary private encryption key of the second temporary encryption key pair.

In operation 1160, the owner device 310 may transmit, to the target device 330, the updated digital key attestation, the encrypted immobilizer token, and a second temporary public encryption key.

According to an embodiment, information including the updated digital key attestation, the encrypted immobilizer token, and the second temporary public encryption key, which is generated by the owner device 310, may be referred to as a digital key entitlement update request.

FIG. 12 is a signal flowchart between the owner device and the target device, for an update of an immobilizer token according to an embodiment. FIG. 12 is a diagram of the signal flowchart which corresponds to the operations of the target device of FIG. 10 and the operations of the owner device of FIG. 11.

In operation 1201, the owner device 310 may transmit, to the target device 330, a request of performing a process of updating an entitlement of a digital key. Operation 1201 may correspond to operation 1010 of FIG. 10 and operation 1110 of FIG. 11.

In operation 1202, the target device 330 may generate a first temporary encryption key pair. Operation 1202 may correspond to operation 1020 of FIG. 10.

In operation 1203, the target device 330 may transmit, to the target device 330, an issuance request of an updated digital key attestation and a request of issuing an immobilizer token. Operation 1203 may correspond to operation 1030 of FIG. 10 and operation 1120 of FIG. 11.

In operation 1204, the owner device 310 may generate an updated digital key attestation. Operation 1204 may correspond to operation 1130 of FIG. 11. Operation 1204 may be performed after operations 1205 to 1206 are performed.

In operation 1205, the owner device 310 may generate a second temporary encryption key pair. Operation 1205 may correspond to operation 1140 of FIG. 11.

In operation 1206, the owner device 310 may encrypt an immobilizer token. Operation 1206 may correspond to operation 1150 of FIG. 11.

In operation 1207, the owner device 310 may transmit the updated digital key attestation, the encrypted immobilizer token, and a second temporary public encryption key. Operation 1207 may correspond to operation 1040 of FIG. 10 and operation 1150 of FIG. 11.

In operation 1208, the target device 330 may store the updated digital key attestation. Operation 1208 may correspond to operation 1050 of FIG. 10.

In operation 1209, the target device 330 may decrypt the encrypted immobilizer token. Operation 1209 may correspond to operation 1060 of FIG. 10.

In operation 1210, the target device 330 may store the decrypted immobilizer token. Operation 1210 may correspond to operation 1070 of FIG. 10.

Figure 13:
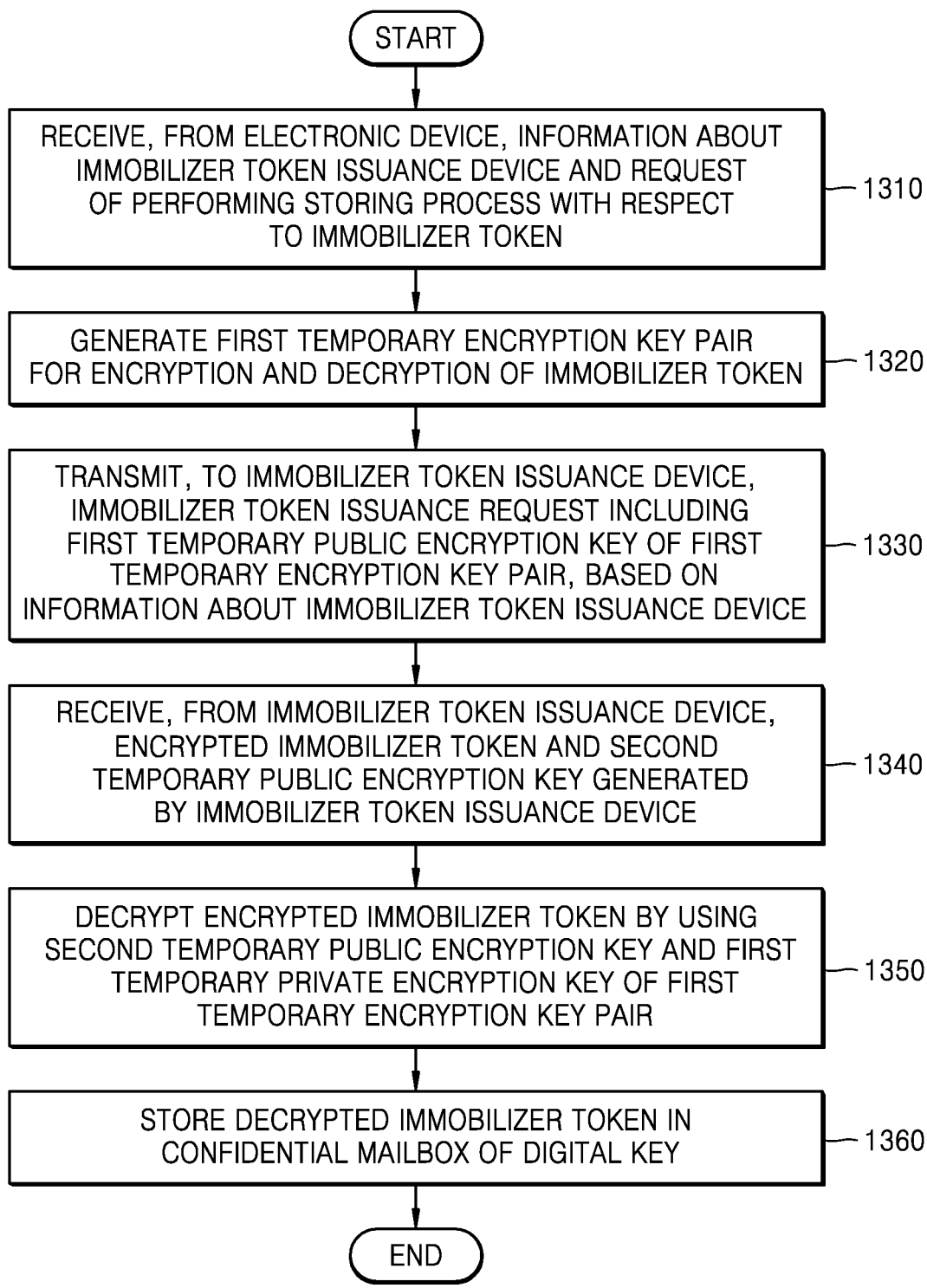
FIG. 13 is a flowchart of an operating method of the target device that receives an immobilizer token update request from the electronic device according to an embodiment.
Figure 14:
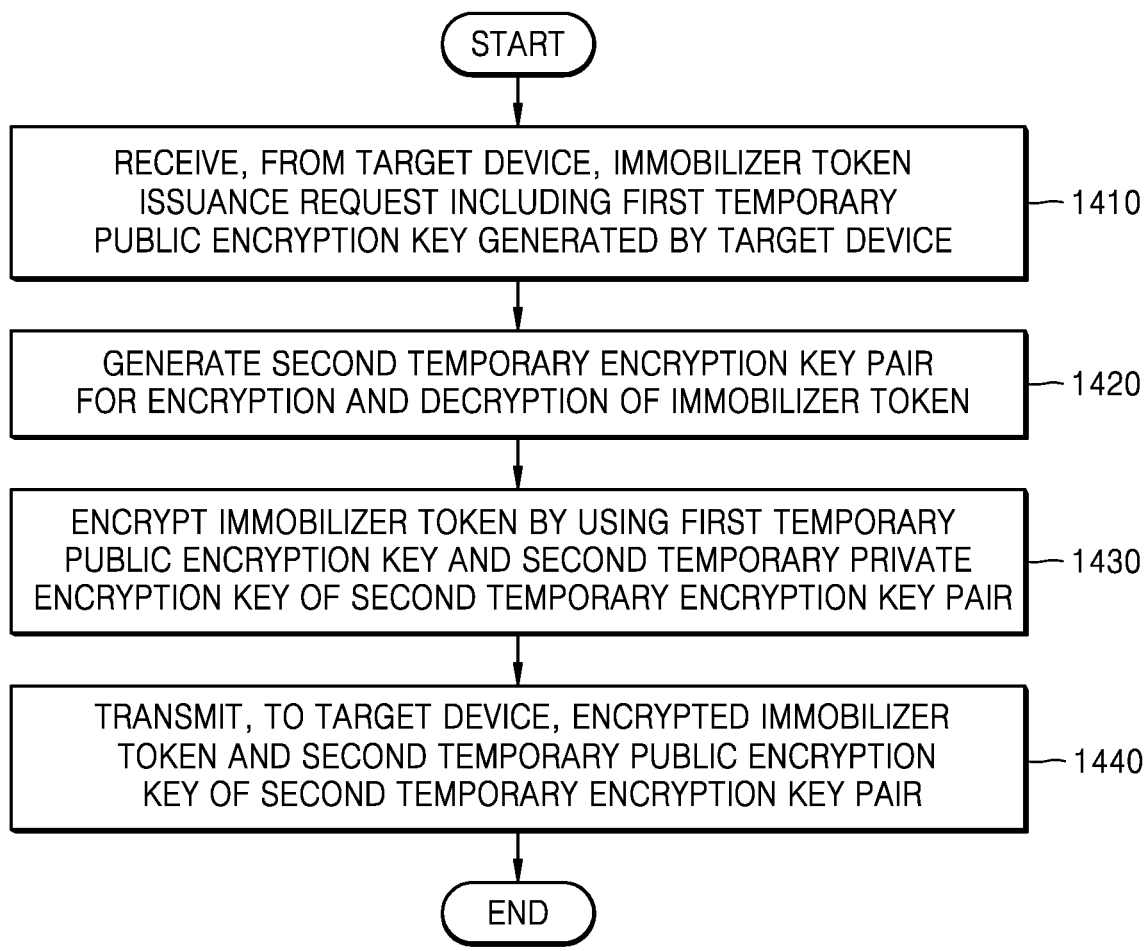
FIG. 14 is a flowchart of an operating method by which the immobilizer token issuance device issues an immobilizer token to the target device that receives an immobilizer token update request from the electronic device according to an embodiment.
Figure 15:
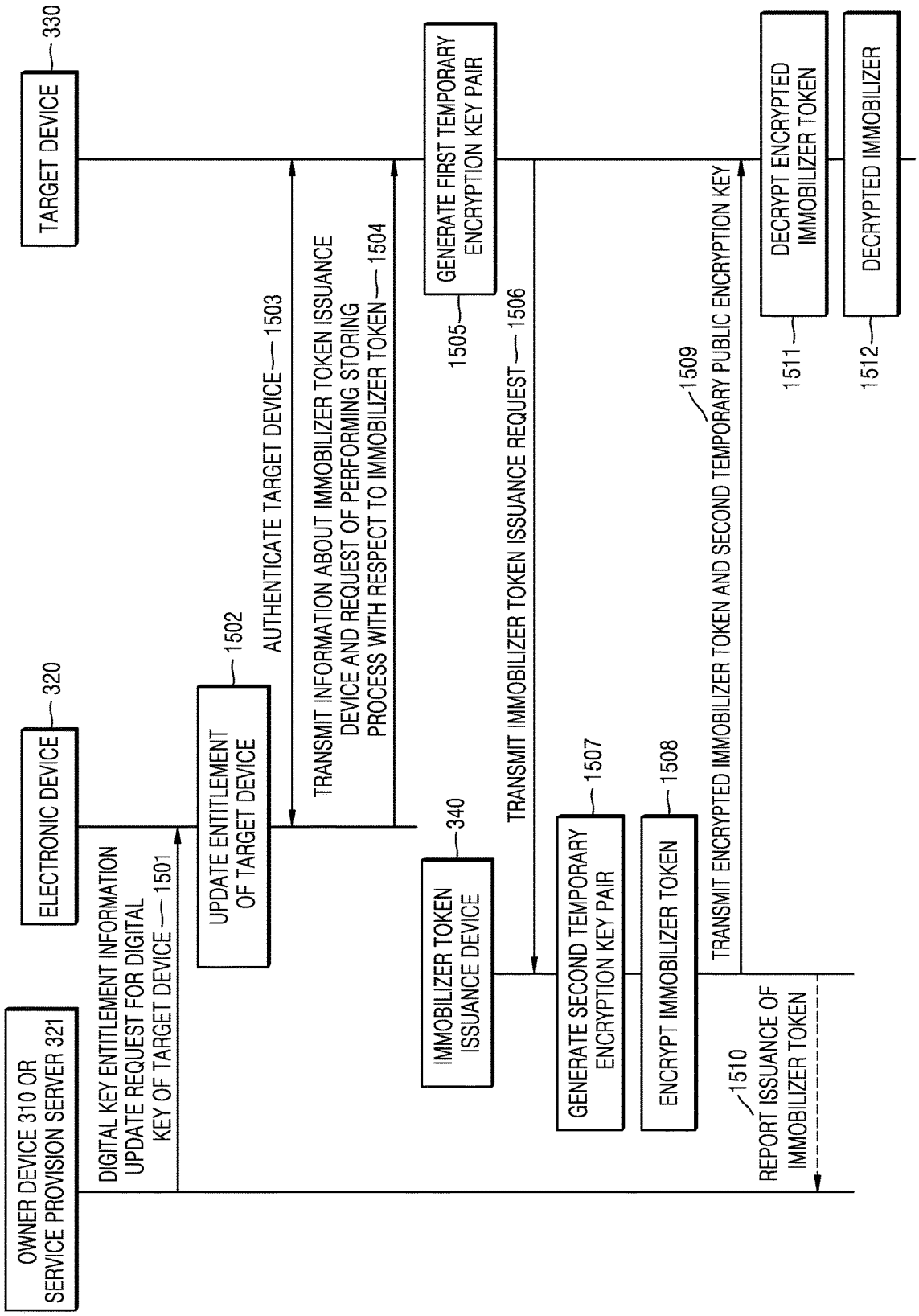
FIG. 15 is a signal flowchart among the electronic device, the target device, and the immobilizer token issuance device, for an update of an immobilizer token, according to an embodiment.

FIGS. 13 to 15 illustrate an embodiment in which the electronic device 320 is used when a method of updating an immobilizer token is performed according to an embodiment. In FIGS. 13 to 15, the immobilizer token issuance device 340 may include a service provision server related to the owner device 310 or the electronic device 320.

FIG. 13 is a flowchart of an operating method of the target device that receives an immobilizer token update request from the electronic device according to an embodiment. Operations of FIG. 13 may be operations of the target device 330 which correspond to operations of the immobilizer token issuance device 340 of FIG. 14. Hereinafter, in descriptions about FIG. 13, operations overlapping afore-described operations of FIG. 5 will be briefly described.

In operation 1310, the target device 330 may receive, from the electronic device 320, information about the immobilizer token issuance device 340 and a request of performing a storing process with respect to an immobilizer token.

According to an embodiment, the request of performing a storing process with respect to an immobilizer token in operation 1504 may be information by which the electronic device 320 notifies the electronic device 330 that the electronic device 320 has an immobilizer token to be issued.

According to an embodiment, the information about the immobilizer token issuance device 340 may include an ID of the immobilizer token issuance device 340. In a case where the immobilizer token issuance device 340 is a server, the information about the immobilizer token issuance device 340 may include information of the server (a uniform resource locator (URL), a server name, a server ID, etc.). According to an embodiment, the target device 330 may have had the information about the immobilizer token issuance device 340 before the target device 330 receives the information from the electronic device 320.

According to an embodiment, the target device 330 may additionally receive, from the electronic device 320, an event ID corresponding to an event of starting the immobilizer token storing process, in addition to the information about the immobilizer token issuance device 340 and the request of performing the storing process with respect to an immobilizer token.

According to an embodiment, the target device 330 may additionally receive, from the electronic device 320, an ID of an immobilizer token along with the information about the immobilizer token issuance device 340 and the request of performing the storing process with respect to an immobilizer token. The ID of the immobilizer token may be an identifier corresponding to an immobilizer token the target device 330 has to be issued, for an update of the immobilizer token. According to an embodiment, the request of performing the storing process with respect to an immobilizer token may be information by which the electronic device 320 notifies the electronic device 330 that the electronic device 320 has the immobilizer token to be issued.

In operation 1320, the target device 330 may generate a first temporary encryption key pair for encryption and decryption of the immobilizer token.

In operation 1330, the target device 330 may transmit, to the immobilizer token issuance device 340, a request of issuing an immobilizer token including a first temporary public encryption key of the first temporary encryption key pair, based on the information about the immobilizer token issuance device.

According to an embodiment, the target device 330 may transmit the immobilizer token issuance request, based on the information about the immobilizer token issuance device 340 received in operation 1310. The immobilizer token issuance request may include the first temporary public encryption key and an ID of a digital key of the target device 330.

According to an embodiment, the immobilizer token issuance request may additionally include the event ID corresponding to the event of starting the immobilizer token storing process, in addition to the first temporary public encryption key and the ID of the digital key of the target device 330. Also, the immobilizer token issuance request may additionally include the ID of the immobilizer token to be issued, in addition to the first temporary public encryption key and the ID of the digital key of the target device 330.

In operation 1340, the target device 330 may receive, from the immobilizer token issuance device 340, an encrypted immobilizer token and a second temporary public encryption key generated by the immobilizer token issuance device.

In operation 1350, the target device 330 may decrypt the encrypted immobilizer token by using the second temporary public encryption key and a first temporary private encryption key of the first temporary encryption key pair.

In operation 1360, the target device 330 may store the decrypted immobilizer token in a confidential mailbox of the digital key.

FIG. 14 is a flowchart of an operating method by which the immobilizer token issuance device issues an immobilizer token to the target device that receives an immobilizer token update request from the electronic device according to an embodiment. Operations of FIG. 14 may be operations of the immobilizer token issuance device 340 which correspond to operations of the target device 330 of FIG. 13. Hereinafter, in descriptions about FIG. 14, operations overlapping afore-described operations of FIG. 6 will be briefly described.

In operation 1410, the immobilizer token issuance device 340 may receive, from the target device 330, a request of issuing an immobilizer token including a first temporary public encryption key generated by the target device.

According to an embodiment, the immobilizer token issuance request may include the first temporary public encryption key and an ID of a digital key of the target device 330. The ID of the digital key may be the ID of the digital key of the target device 330 which corresponds to an immobilizer token to be issued by the immobilizer token issuance device 340.

According to an embodiment, the immobilizer token issuance request may additionally include an event ID corresponding to an event of starting am immobilizer token storing process, in addition to the first temporary public encryption key and the ID of the digital key of the target device 330. Also, the immobilizer token issuance request may additionally include an ID of an immobilizer token to be issued, in addition to the first temporary public encryption key and the ID of the digital key of the target device 330. In operation 1420, the immobilizer token issuance device 340 may generate a second temporary encryption key pair for encryption and decryption of the immobilizer token.

In operation 1430, the immobilizer token issuance device 340 may encrypt the immobilizer token by using the first temporary public encryption key and a second temporary private encryption key of the second temporary encryption key pair.

In operation 1440, the immobilizer token issuance device 340 may transmit, to the target device 330, the encrypted immobilizer token and a second temporary public encryption key of the second temporary encryption key pair.

FIG. 15 is a signal flowchart among the electronic device, the target device, and the immobilizer token issuance device, for an update of an immobilizer token, according to an embodiment. FIG. 15 is a diagram of the signal flowchart which corresponds to the operations of the target device of FIG. 13 and the operations of the immobilizer token issuance device of FIG. 14.

In operation 1501, a service provision server 321 related to the owner device 310 or the electronic device 320 may transmit, to the electronic device 320, a digital key entitlement information update request for a digital key of the target device 330.

According to an embodiment, the digital key entitlement information update request for the digital key of the target device 330 may include an updated digital key attestation and information indicating whether an update of an immobilizer token is required.

According to an embodiment, the owner device 310 may perform direct communication by using D2D connectivity including NFC, Wi-Fi, Bluetooth, UWB, and the like. The owner device 310 may transmit the digital key entitlement information update request to the electronic device 320 via direction communication.

According to an embodiment, the owner device 310 may communicate with the electronic device 320 via one or more relay servers. The relay server may include a manufacturer server of the owner device 310, a manufacturer server of the electronic device 320, a manufacturer server of the target device 330, or the like. The owner device 310 may transmit the digital key entitlement information update request to the electronic device 320 via communication via the relay server.

According to an embodiment, when the digital key entitlement information update request is first generated by the service provision server 321 related to the electronic device 320 and is transmitted to the electronic device 320, the electronic device 320 may be enabled to verify a signature of the service provision server 321 related to the electronic device 320. Therefore, without involvement by the owner device 310, the service provision server 321 related to the electronic device 320 may first generate and transmit the digital key entitlement information update request to the electronic device 320.

In operation 1502, the electronic device 320 may update an entitlement of the target device 330.

According to an embodiment, the electronic device 320 may store the updated digital key attestation included in the entitlement information update request received in operation 1501. The electronic device 320 may update the entitlement of the target device 330, based on the updated digital key attestation. The electronic device 320 may be directly issued a digital key attestation without involvement by the target device 330, and may update the entitlement of the target device 330. Therefore, direction communication between the owner device 310 and the target device 330 may not be requested to update the entitlement of the digital key.

In operation 1503, the electronic device 320 may authenticate the target device 330.

According to an embodiment, operation 1503 may be performed when the target device 330 approaches the electronic device 320. For example, when the target device 330 approaches the electronic device 320 and thus direction communication connection is established between the target device 330 and the electronic device 320, the electronic device 320 may authenticate the target device 330.

In operation 1504, the electronic device 320 may transmit, to the target device 330, information about the immobilizer token issuance device 340 and a request of performing a storing process with respect to an immobilizer token. Operation 1501 may correspond to operation 1310 of FIG. 13.

According to an embodiment, operation 1504 may be performed when the electronic device 320 successfully authenticated the target device 330 in operation 1503.

According to an embodiment, the request of performing a storing process with respect to an immobilizer token in operation 1504 may be information by which the electronic device 320 notifies the electronic device 330 that the electronic device 320 has an immobilizer token to be issued. Also, the electronic device 320 may transmit, to the target device 330, the request of performing a storing process with respect to an immobilizer token along with an ID corresponding to an event of starting the immobilizer token storing process and an ID of the immobilizer token, as additional information. The ID of the immobilizer token may be an identifier corresponding to an immobilizer token to be issued for an update of the immobilizer token.

According to an embodiment, when the immobilizer token issuance device is a server, the information about the immobilizer token issuance device 340 may include information of the server (a URL, a server name, a server ID, etc.).

In operation 1505, the target device 330 may generate a first temporary encryption key pair. Operation 1505 may correspond to operation 1320 of FIG. 13.

In operation 1506, the target device 330 may transmit an immobilizer token issuance request to the immobilizer token issuance device 340. Operation 1506 may correspond to operation 1330 of FIG. 13 and operation 1410 of FIG. 14.

According to an embodiment, the target device 330 may transmit the immobilizer token issuance request, based on the information about the immobilizer token issuance device 340 received in operation 1504. The immobilizer token issuance request may include a first temporary public encryption key and an ID of a digital key of the target device 330. Also, the immobilizer token issuance request may additionally include the event ID corresponding to the event of starting the immobilizer token storing process and the ID of the immobilizer token to be issued.

In operation 1507, the immobilizer token issuance device 340 may generate a second temporary encryption key pair. Operation 1507 may correspond to operation 1420 of FIG. 14.

In operation 1508, the immobilizer token issuance device 340 may encrypt the immobilizer token. Operation 1508 may correspond to operation 1430 of FIG. 14.

In operation 1509, the immobilizer token issuance device 340 may transmit, to the target device 330, the encrypted immobilizer token and a second temporary public encryption key. Operation 1509 may correspond to operation 1340 of FIG. 13 and operation 1440 of FIG. 14.

In operation 1510, when the owner device 310 is not the immobilizer token issuance device 340, the immobilizer token issuance device 340 may report, to the owner device 310, that the immobilizer token has been issued to the target device 330.

In operation 1511, the target device 330 may decrypt the encrypted immobilizer token. Operation 1511 may correspond to operation 1350 of FIG. 13.

In operation 1512, the target device 330 may store the decrypted immobilizer token. Operation 1512 may correspond to operation 1360 of FIG. 13.

Figure 16:
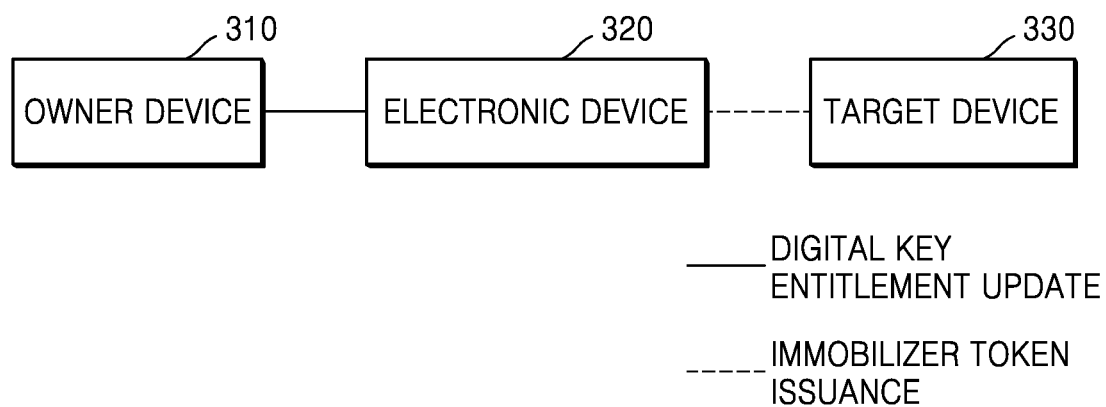
FIG. 16 illustrates an example of system architecture in which the electronic device issues an immobilizer token to the target device such that the immobilizer token is updated, according to an embodiment.

FIG. 16 illustrates an example of system architecture in which the electronic device issues an immobilizer token to the target device such that the immobilizer token is updated, according to an embodiment.

Referring to FIG. 16, the owner device 310, the electronic device 320, and the target device 330 may configure the system for an update of an immobilizer token.

According to an embodiment, the owner device 310 and the electronic device 320 may perform direct communication by using D2D connectivity including NFC, Wi-Fi, Bluetooth, UWB, and the like. Also, the owner device 310 and the electronic device 320 may perform communication via one or more relay servers. The relay server may include a manufacturer server of the owner device 310, a manufacturer server of the electronic device 320, a manufacturer server of the target device 330, or the like.

The owner device 310 may directly perform an update of an entitlement (e.g., to curtail/extend a validation period) of a digital key of the target device 330 which does not require issuance of an immobilizer token, without involvement by the target device 330. For example, the owner device 310 may directly transmit information about a digital key entitlement update to the electronic device 320 so as to allow the electronic device 320 to update the entitlement of the digital key of the target device 320.

According to an embodiment, the electronic device 320 and the target device 330 may perform direct communication by using D2D connectivity including NFC, Wi-Fi, Bluetooth, UWB, and the like.

According to an embodiment, the owner device 310 may request the electronic device 320 to issue an immobilizer token to the target device 330. In response to the request from the owner device 310, the electronic device 320 may directly issue the immobilizer token to the target device 330.

Figure 17:
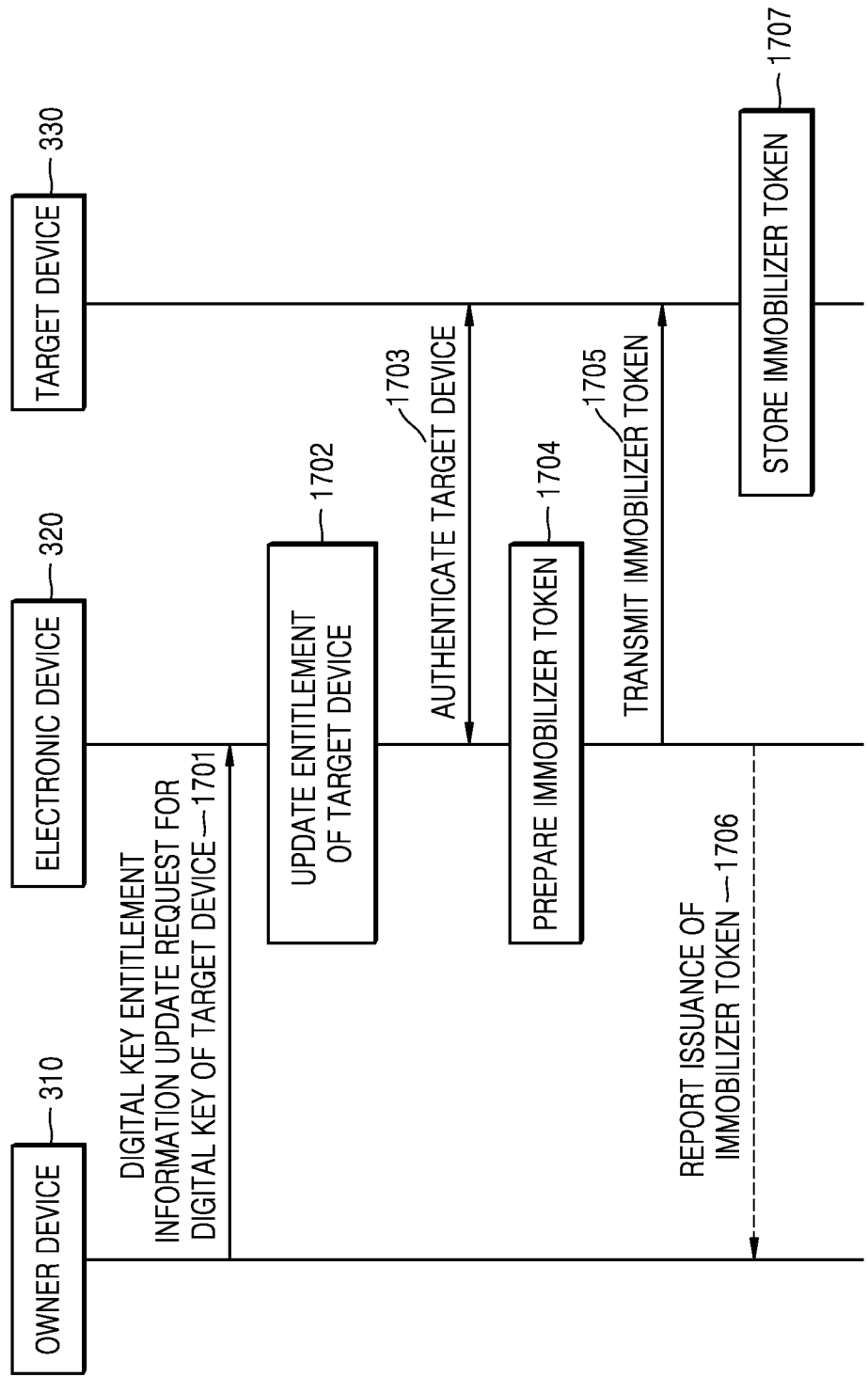
FIG. 17 is a signal flowchart among the owner device, the electronic device, and the target device, in order to update an immobilizer token by issuing the immobilizer token to the target device from the electronic device, according to an embodiment.

FIG. 17 is a signal flowchart among the owner device, the electronic device, and the target device, in order to update an immobilizer token by issuing the immobilizer token to the target device from the electronic device, according to an embodiment.

In operation 1701, the owner device 310 may transmit, to the electronic device 320, a digital key entitlement information update request for a digital key of the target device 330.

According to an embodiment, the owner device 310 may transmit, to the electronic device 320, the digital key entitlement information update request via direct communication by using D2D connectivity including NFC, Wi-Fi, Bluetooth, UWB, and the like. Also, the owner device 310 may transmit, to the electronic device 320, the digital key entitlement information update request via communication via one or more relay servers.

According to an embodiment, the digital key entitlement information update request may include updated digital key attestation for updating an entitlement of the digital key of the target device 330. Also, the digital key entitlement information update request may include information indicating whether an update of an immobilizer token is required. The information indicating whether the update of the immobilizer token is required may additionally include ID information of the immobilizer token to be issued. The information indicating whether the update of the immobilizer token is required may be replaced with the ID information of the immobilizer token to be issued.

In operation 1702, the electronic device 320 may update the entitlement of the target device 320.

According to an embodiment, the electronic device 320 may store the updated digital key attestation included in the digital key entitlement information update request received in operation 1701. The electronic device 320 may update the entitlement of the target device 330, based on the updated digital key attestation. The electronic device 320 may be directly issued a digital key attestation without involvement by the target device 330, and may update the entitlement of the target device 330. Therefore, direction communication between the owner device 310 and the target device 330 may not be requested to update the entitlement of the digital key.

In operation 1703, the electronic device 320 may authenticate the target device 330.

According to an embodiment, operation 1703 may be performed when the target device 330 approaches the electronic device 320. For example, when the target device 330 approaches the electronic device 320 and thus direction communication connection is established between the target device 330 and the electronic device 320, the electronic device 320 may authenticate the target device 330.

According to an embodiment, when the target device 330 is successfully attested, a secure communication channel in which security is granted may be established between the electronic device 320 and the target device 330. By authenticating the target device 330, the electronic device 320 may be given access authority over a secure element of the target device 330. Therefore, the electronic device 320 may perform an immobilizer token update process on the target device 330, without a procedure for accessing the secure element of the target device 330, the procedure including an encryption and decryption procedure via generation of a temporary encryption key.

In operation 1704, the electronic device 320 may prepare an immobilizer token.

According to an embodiment, the electronic device 320 may prepare an immobilizer token corresponding to the ID of the immobilizer token received in operation 1701. The electronic device 320 may pre-generate and then store the immobilizer token, and may generate the immobilizer token by using the ID of the immobilizer token.

In operation 1705, the electronic device 320 may transmit the immobilizer token to the target device 330.

According to an embodiment, the electronic device 320 may transmit the immobilizer token via the secure communication channel established in response to attestation of the target device 330 in operation 1703. Therefore, the electronic device 320 may transmit the immobilizer token to the target device 330 without encryption of the immobilizer token.

In operation 1706, the electronic device may report, to the owner device 310, that the immobilizer token has been issued to the target device 330.

In operation 1707, the target device 330 may store the immobilizer token.

According to an embodiment, the immobilizer token that is not encrypted may be received by the target device 330 via the secure channel. Accordingly, the target device 330 may directly store the immobilizer token in a confidential mailbox of the digital key in its secure element, without performing a separate decryption process.

Figure 18:
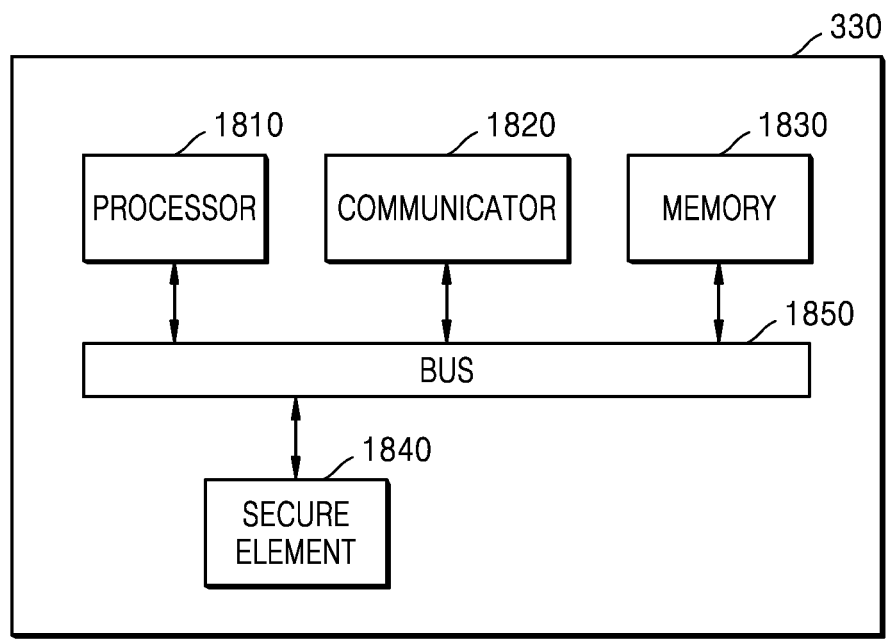
FIG. 18 is a diagram illustrating a configuration of the target device according to an embodiment.

FIG. 18 is a diagram illustrating a configuration of the target device according to an embodiment.

Referring to FIG. 18, the target device 330 may include a processor 1810, a communicator 1820, a memory 1830, a secure element 1840, and a bus 1850 connecting elements to each other. However, the target device 330 is not limited thereto, and may include more or fewer elements than those shown in FIG. 18.

In FIG. 18, the target device 330 includes one processor, but an embodiment is not limited thereto and the target device 330 may include a plurality of processors. Hereinafter, at least some of operations and functions of the processor 1810 described below may be performed by a plurality of processors. The target device 330 of FIG. 18 may perform a method of updating an immobilizer token according to various embodiments of the disclosure, and descriptions of FIGS. 2 to 18 may be applied thereto. Thus, the descriptions provided above are not provided again.

The communicator 1820 may perform wired/wireless communication with another device, server, or network. In this regard, the communicator 1820 may include a communication module supporting at least one of various wired/wireless communication methods. For example, the communication module may be in the form of a chipset or may be a sticker/barcode (for example, a sticker including an NFC tag) including information required for communication.

The wireless communication may include, for example, at least one of cellular communication, Wi-Fi, Wi-Fi direct, Bluetooth, Bluetooth Low Energy (BLE), UWB, or NFC. The wired communication may include, for example, at least one of universal serial bus (USB) or high-definition multimedia interface (HDMI).

In an embodiment, the communicator 1820 may include a communication module for short range communication. For example, the communicator 1820 may include a communication module for performing various short range communications such as infrared communication and magnetic secure transmission (MST), in addition to Wi-Fi, Wi-Fi direct, Bluetooth, BLE, NFC, and UWB described above.

A program such as an application and various types of data such as a file may be installed and stored in the memory 1830. The processor 1810 may access and use the data stored in the memory 1830 or may store new data in the memory 1830. In an embodiment, a program and data for updating an immobilizer token may be installed and stored in the memory 1830. However, an embodiment of the disclosure is not limited thereto, and the program and data for updating the immobilizer token may be installed and stored in the secure element 1840.

The secure element 1840 is a secure storage device of the target device 330, and is a secure region to which only an authenticated application is accessible. The secure element 1840 may be configured to be separated from a general storage area in terms of software or may be configured to be physically separated from the memory 1830. The secure element 1840 may correspond to the secure element 230 of FIG. 2.

The processor 1810 may control overall operations of the target device 330 and include at least one processor, such as a central processing unit (CPU) or a graphics processing unit (GPU). The processor 1810 may control other elements included in the target device 330 to perform an operation of updating the immobilizer token.

The processor 1810 may execute a program stored in the memory 1810 and the secure element 1840, may read a file stored in the memory 1810 and the secure element 1840, or may store a new file in the memory 1810 and the secure element 1840.

According to some embodiments of the disclosure, the processor 1810 may receive a request of performing a storing process with respect to an immobilizer token corresponding to a digital key, from the owner device 310 that has issued the digital key to the target device or the electronic device 320 that is controlled by the digital key. Also, the processor 1810 may generate a first temporary encryption key pair for encryption and decryption of the immobilizer token. Also, the processor 1810 may transmit, to the immobilizer token issuance device 340, an immobilizer token issuance request including a first temporary public encryption key of the generated first temporary encryption key pair. Also, the processor 1810 may receive, from the immobilizer token issuance device 340, an encrypted immobilizer token and a second temporary public encryption key generated by the immobilizer token issuance device 340. Also, the processor 1810 may decrypt the encrypted immobilizer token by using the second temporary public encryption key and a first temporary private encryption key of the first temporary encryption key pair. Also, the processor 1810 may store the decrypted immobilizer token in a confidential mailbox of a digital key in the secure element 1840.

According to some embodiments of the disclosure, the processor 1810 may generate encryption key attestation for authenticating that the first temporary encryption key pair is for an access to the confidential mailbox of the digital key. Also, the processor 1810 may add the first temporary public encryption key to the encrypted key authentication and may transmit the encryption key attestation to the immobilizer token issuance device 340.

According to some embodiments of the disclosure, the processor 1810 may calculate a symmetric key by using the second temporary public encryption key and the first temporary private encryption key of the first temporary encryption key pair, and may decrypt the encrypted immobilizer token by using the symmetric key.

According to some embodiments of the disclosure, when the immobilizer token issuance device 340 is the owner device 310, the request of performing a storing process with respect to an immobilizer token may be received from the owner device 310. Also, the processor 1810 may receive, from the owner device 310, an updated digital key attestation indicating an updated entitlement of the digital key and the request of performing a storing process with respect to an immobilizer token. Also, the processor 1810 may store the updated digital key attestation, and the updated digital key attestation may include a public key of the target device, updated entitlement information of the digital key, and a signature of the owner device.

According to some embodiments of the disclosure, when the immobilizer token issuance device 340 is the owner device 310, the processor 1810 may receive, from the owner device 310, a request of performing a process of updating an entitlement of a digital key which includes the request of performing a storing process with respect to an immobilizer token. Also, the processor 1810 may transmit, to the owner device 310, the immobilizer token issuance request along with an issuance request of an updated digital key attestation indicating the updated entitlement of the digital key. Also, the processor 1810 may receive, from the owner device 310, an updated digital key attestation along with the encrypted immobilizer token and the second temporary public encryption key. Also, the processor 1810 may store the updated digital key attestation, and the updated digital key attestation may include the public key of the target device, the updated entitlement information of the digital key, and the signature of the owner device.

According to some embodiments of the disclosure, when the immobilizer token issuance device 340 is one of service provision servers related to the owner device 310 or the electronic device 320, the processor 1810 may receive, from the electronic device 320, information about the immobilizer token issuance device 340 along with the request of performing a storing process with respect to an immobilizer token. Also, the processor 1810 may transmit, to the immobilizer token issuance device 340, the immobilizer token issuance request based on the information about the immobilizer token issuance device 340, and the immobilizer token issuance request may include an ID of the digital key.

The bus 1850 is a common data transmission path connecting the communicator 1820, the memory 1830, the secure element 1840, and the processor 1810.

Figure 19:
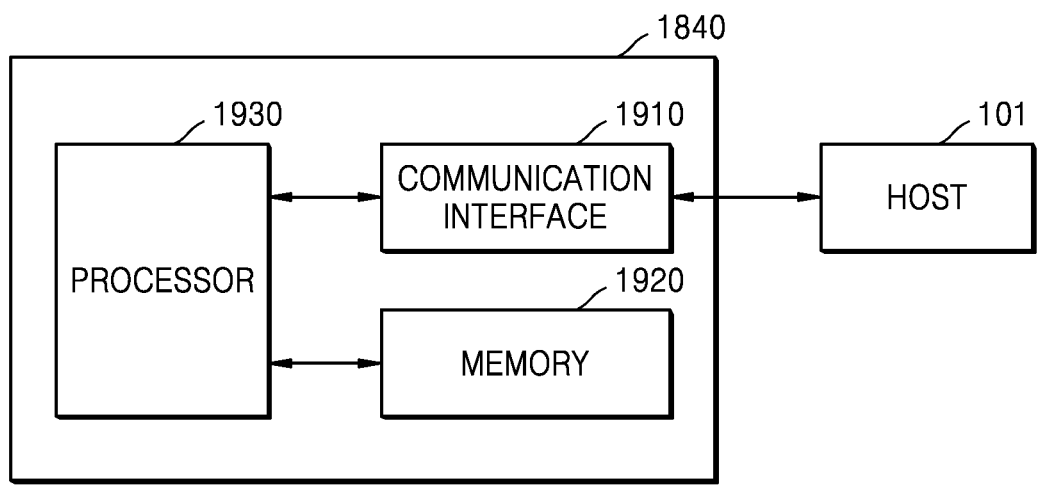
FIG. 19 is a diagram illustrating a configuration of a secure element according to an embodiment.

FIG. 19 is a diagram illustrating a configuration of a secure element according to an embodiment.

Referring to FIG. 19, the secure element 1840 may include a communication interface 1910, a memory 1920, and a processor 1930.

In various embodiments, the secure element 1840 is a secure storage device of the target device 330, and is a secured domain to which only an authenticated application is accessible. In an embodiment, the secure element 1840 may include an embedded secure element (eSE), a universal integrated circuit card (UICC), a secure digital card (SD Card), an embedded UICC (eUICC), and/or a trusted execution environment (TEE).

The communication interface 1910 may communicate with a host 101. In an embodiment, the communication interface 1910 may include at least one of various wired/wireless communication interfaces for communicating with the host 101. In this regard, the host 101 is one of devices included in the target device 330, and for example, may include an application processor (AP), a memory, or the like. The communication interface 1910 may be, for example, a serial interface such as ISO 7816, universal serial bus (USB), an inter-integrated circuit (I2C), a serial peripheral interface (SPI), a single wire protocol (SWP), and/or UWB, or any serial interface generally used for communication between two hardware devices. Alternatively, the communication interface 1910 may be a wireless interface, such as ISO 14443, ZigBee, Bluetooth, or the like, which directly connects an antenna to a hardware device. Furthermore, the communication interface 1910 may be a parallel interface connected to a center bus of the target device 330, and in this case, the communication interface 1910 may include a buffer for receiving a command and data from the host 101.

In the memory 1920, a program such as an application and various types of data such as files may be installed and stored. The processor 1930 may access and use data stored in the memory 1920, or may store new data in the memory 1920. In an embodiment, in the memory 1920, a program and data for processing a digital key may be installed and stored.

The processor 1930 may control all operations of the secure element 1840, and may include at least one of processors including a CPU, a GPU, and the like. The processor 1930 may control other configurations included in the secure element 1840 to perform an operation of processing a digital key. For example, the processor 1930 may execute a program stored in the memory 1920, may read a file stored in the memory 1920, or may store a new file in the memory 1920. In an embodiment, the processor 1930 may execute a program stored in the memory 1920 to perform an operation of processing a digital key.

The secure element 1840 of FIG. 19 may correspond to the secure element 230 of FIG. 2 and the secure element 1840 of FIG. 18. Descriptions with respect to FIGS. 2 and 18 may be equally applied to the secure element 1840 of FIG. 19.

Figure 20:
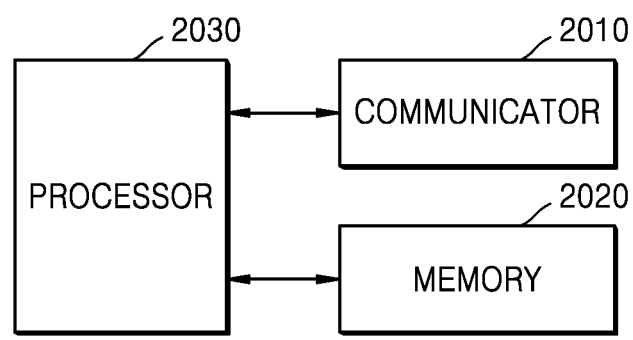
FIG. 20 is a diagram illustrating a configuration of the immobilizer token issuance device according to an embodiment.

FIG. 20 is a diagram illustrating a configuration of the immobilizer token issuance device according to an embodiment.

As illustrated in FIG. 20, the immobilizer token issuance device 340 according to an embodiment may include a communicator 2010, a memory 2020, and a processor 2030. However, the immobilizer token issuance device 340 is not limited thereto, and may include more or fewer elements than those shown in FIG. 20.

In FIG. 20, the immobilizer token issuance device 340 includes one processor, but an embodiment is not limited thereto and the immobilizer token issuance device 340 may include a plurality of processors. Hereinafter, at least some of operations and functions of the processor 2030 described below may be performed by a plurality of processors. The immobilizer token issuance device 340 of FIG. 20 may perform a method of updating an immobilizer token according to various embodiments of the disclosure, and descriptions of FIGS. 2 to 20 may be applied thereto. Thus, the descriptions provided above are not provided again.

The communicator 2010 may perform wired/wireless communication with another device, server, or network. In this regard, the communicator 2010 may include a communication module supporting at least one of various wired/wireless communication methods. For example, the communication module may be in the form of a chipset or may be a sticker/barcode (for example, a sticker including an NFC tag) including information required for communication.

The wireless communication may include, for example, at least one of cellular communication, Wi-Fi, Wi-Fi direct, Bluetooth, UWB, or NFC. The wired communication may include, for example, at least one of USB or HDMI.

In an embodiment, the communicator 2010 may include a communication module for short range communication. For example, the communicator 2010 may include a communication module for performing various short range communications such as infrared communication and MST, in addition to Wi-Fi, Wi-Fi direct, Bluetooth, NFC, and UWB described above.

In addition, the communicator 2010 may include a communication module for short range communication. For example, the communicator 2010 may include a communication module for performing various short range communications such as infrared communication and MST, in addition to Wi-Fi, Wi-Fi direct, Bluetooth, and NFC described above.

A program such as an application and various types of data such as a file may be installed and stored in the memory 2020. The processor 2030 may access and use the data stored in the memory 2020 or may store new data in the memory 2020. In an embodiment, a program and data for updating an immobilizer token may be installed and stored in the memory 2020.

The processor 2030 may control a series of processes in which the immobilizer token issuance device 340 may operate according to an embodiment of the disclosure. For example, the processor 2030 may control elements of the immobilizer token issuance device 340 to perform an operation of the immobilizer token issuance device 340 according to an embodiment of the disclosure. The processor 2030 may refer to a plurality of processors, and may execute a program stored in the memory 2020 to perform the operation of the immobilizer token issuance device 340.

The processor 2030 may control all operations of the target device 330, and may include at least one of processors including a CPU, a GPU, and the like. The processor 2030 may control other configurations included in the target device 300 to perform an operation of updating an immobilizer token.

The processor 2030 may execute a program stored in the memory 2020, may read a file stored in the memory 2020, or may store a new file in the memory 2020.

According to some embodiments of the disclosure, the processor 2030 may receive, from the target device 330, a request of issuing an immobilizer token corresponding to a digital key of the target device 330, the request including a first temporary public encryption key generated by the target device 330. Also, the processor 2030 may generate a second temporary encryption key pair for encryption and decryption of the immobilizer token. Also, the processor 2030 may encrypt the immobilizer token by using the first temporary public encryption key and a second temporary private encryption key of the second temporary encryption key pair. Also, the processor 2030 may transmit, to the target device 330, the encrypted immobilizer token and a second temporary public encryption key of the second temporary encryption key pair.

According to some embodiments of the disclosure, the first temporary public encryption key may be one from among the first temporary encryption key pair generated by the target device for encryption and decryption of the immobilizer token. Also, the processor 2030 may receive an encryption key attestation authenticating that the first temporary encryption key pair including the first temporary public encryption key is for an access to a confidential mailbox of a digital key Also, the processor 2030 may verify a signature of the target device which is included in the encryption key attestation.

According to some embodiments of the disclosure, the processor 2030 may calculate a symmetric key by using the second temporary private encryption key of the generated second temporary encryption key pair and the first temporary public encryption key, and may encrypt the immobilizer token by using the symmetric key.

According to some embodiments of the disclosure, the immobilizer token issuance device 340 may be the owner device 310. In this case, the processor 2030 may transmit, to the target device 330, a request of performing a storing process with respect to an immobilizer token, and the immobilizer token issuance request may be received from the target device 330, in response to the transmitted request of performing the storing process with respect to the immobilizer token.

According to some embodiments of the disclosure, when the immobilizer token issuance device 340 is the owner device 310, the processor 2030 may receive, from the owner device 310, an updated digital key attestation indicating an updated entitlement of the digital key along with the request of performing the storing process with respect to the immobilizer token. Also, the processor 2030 may store the updated digital key attestation, and the updated digital key attestation may include a public key of the target device, updated entitlement information of the digital key, and a signature of the owner device 310.

According to some embodiments of the disclosure, when the immobilizer token issuance device 340 is the owner device 310, the processor 2030 may transmit, to the target device 330, a request of performing a process of updating an entitlement of a digital key which includes the request of performing the storing process with respect to the immobilizer token. Also, the processor 2030 may receive, from the target device 330, the immobilizer token issuance request along with a request of issuing the updated digital key attestation indicating the updated entitlement of the digital key. Also, the processor 2030 may generate the updated digital key attestation and may transmit, to the target device 330, the updated digital key attestation along with the encrypted immobilizer token and the second temporary public encryption key, and the updated digital key attestation may include the public key of the target device, the updated entitlement information of the digital key, and the signature of the owner device.

According to some embodiments of the disclosure, the immobilizer token issuance device 340 may be one of service provision servers related to the owner device 310 and the electronic device 320. In this case, the immobilizer token issuance request which is received from the target device 330 may include an ID of the digital key and an ID of the immobilizer token, and the ID of the immobilizer token may have been transmitted from the electronic device 320 to the target device 330 along with the immobilizer token issuance request.

The methods according to embodiments as described in the specification or in the following claims of the disclosure may be implemented as hardware, software, or a combination of hardware and software.

When implemented as software, a computer-readable storage medium storing one or more programs (e.g., software modules) may be provided. The one or more programs stored in the computer-readable storage medium are configured for execution by one or more processors in an electronic device. The one or more programs include instructions directing the electronic device to execute the methods according to embodiments as described the specification or in the following claims of the disclosure.

The programs (e.g., software modules or software) may be stored in non-volatile memory including random access memory (RAM) or flash memory, read only memory (ROM), electrically erasable programmable read only memory (EEPROM), a magnetic disc storage device, a compact disc (CD)-ROM, a digital versatile disc (DVD), another optical storage device, or a magnetic cassette. Alternatively, the programs may be stored in memory including a combination of some or all of the above-mentioned storage media. Also, a plurality of such memories may be included.

In addition, the programs may be stored in an attachable storage device accessible through any or a combination of communication networks such as Internet, an intranet, a local area network (LAN), a wide LAN (WLAN), a storage area network (SAN), or the like. Such a storage device may access, via an external port, a device performing the embodiments of the disclosure. Furthermore, a separate storage device on the communication network may access the electronic device performing the embodiments of the disclosure.

Specific embodiments of the disclosure have been described in the descriptions of the disclosure, but it will be understood that various modifications can be made without departing the scope of the disclosure. Thus, it will be apparent to one of ordinary skill in the art that the scope of the disclosure is not limited to the embodiments described herein and should be defined by the appended claims and their equivalents.

The block diagrams as described in the disclosure may be construed by one of ordinary skill in the art as conceptual representation of circuitry for implementing the principles of the disclosure Similarly, it is also understood by one of ordinary skill in the art that any flowcharts, flow diagrams, state transitions, pseudo codes, etc., may be substantially embodied in a computer-readable medium as various processes that may be carried out by a computer or processor, whether or not the computer or the processor is explicitly shown. Accordingly, the aforementioned embodiments of the disclosure may be written into a program that may be executed by a computer, and may be implemented in a universal digital computer for carrying out the program by using a computer-readable recording medium. The computer-readable recording medium includes a storage medium, such as magnetic storage medium (e.g., ROM, floppy disk, hard disk, etc.), an optical medium (e.g., CD-ROM, DVD, etc.), or the like.

Functions of the various elements shown in the drawings may be associated with appropriate software and thus may be provided by the use of dedicated hardware as well as hardware capable of executing the software. When provided by a processor, the functions may be provided by a single dedicated processor, a single shared processor, or a plurality of individual processors in which some of them may be shared. Also, the explicit use of the term "processor" or "controller" should not be interpreted as making exclusive reference to hardware capable of executing software, but may be construed as implicitly including, without limitation, digital signal processor (DSP) hardware, a ROM for storing software, a RAM, and a non-volatile storage device.

In the attached claims of the specification, an element represented as a unit for performing a particular function encompasses any method of performing the particular function, the element being intended to encompass a combination of circuit elements that perform the particular function, or any form of software including firmware, microcode, etc., in combination with circuitry suitable for carrying out the software to perform the particular function.

Throughout the specification, reference to "an embodiment" of principles of the disclosure and various modifications thereof intend that particular properties, structures, features, etc., are included in at least one embodiment of the principle of the disclosure. Thus, the term "an embodiment" and any other modifications provided in the specification do not necessarily refer to the same embodiment of the disclosure.

Throughout the disclosure, the expression "at least one of a or b" indicates only a, only b, or both a and b. Additionally, throughout the disclosure, the expression "at least one of a, b or c" collectively indicates only a, only b, only c, both a and b, both a and c, both b and c, all of a, b, and c, or variations thereof. Even when more items are enumerated, they may be clearly and expansively interpreted by one of ordinary skill in the art.

The disclosure has been described with reference to the embodiments thereof.

It is to be understood that all embodiments of the disclosure and conditional exemplification as disclosed in the specification are intended to assist one of ordinary skill in the art in understanding the principles and concepts of the disclosure, and thus one of ordinary skill in the art may understand that the embodiments of the disclosure may be modified without departing from the substantial characteristics of the disclosure. Therefore, the disclosed embodiments of the disclosure should be considered in an illustrative sense rather than a restrictive sense. The scope of the disclosure is defined only by the following claims, and all the equivalents of the embodiments may also be construed to be in the scope of the disclosure.

The invention claimed is:

1. A method performed by a target device for updating an immobilizer token, the method comprising:

receiving a request of performing a storing process with respect to the immobilizer token, from an owner device or from an electronic device, wherein a digital key for the target device is allowed by the owner device, the electronic device is controlled by the digital key, and wherein the request of performing the storing process with respect to the immobilizer token is associated with an updating process of the immobilizer token;

generating a first temporary encryption key pair for encryption and decryption of the immobilizer token, wherein the first temporary encryption key pair is associated with an access to a confidential mailbox of the digital key;

generating an encryption key attestation including a first temporary public encryption key and a value obtained by signing the first temporary public encryption key with a private key of the target device, wherein the encryption key attestation is associated with an authentication that the first temporary encryption key pair is for the access to the confidential mailbox of the digital key;

transmitting, to an immobilizer token issuance device, an immobilizer token issuance request comprising the first temporary public encryption key, wherein the first temporary public encryption key is included in a form of the encryption key attestation, and wherein the signing in the encryption key attestation is verified by the immobilizer token issuance device;

receiving, from the immobilizer token issuance device, an encrypted immobilizer token and a second temporary public encryption key generated by the immobilizer token issuance device;

decrypting the encrypted immobilizer token by using the second temporary public encryption key and a first temporary private encryption key of the generated first temporary encryption key pair; and updating the immobilizer token based on the first temporary encryption key pair by storing the decrypted immobilizer token in the confidential mailbox of the digital key.

2. The method of claim 1, wherein the immobilizer token issuance device is the owner device, and wherein the request of performing the storing process with respect to the immobilizer token is received from the owner device.

3. The method of claim 2, wherein the receiving of the request of performing the storing process with respect to the immobilizer token comprises:

receiving, from the owner device, an updated digital key attestation indicating an updated entitlement of the digital key and the request of performing the storing process with respect to the immobilizer token, and the method further comprises storing the updated digital key attestation, and wherein the updated digital key attestation comprises a public key of the target device, updated entitlement information of the digital key, and a signature of the owner device.

4. The method of claim 2, wherein the receiving of the request of performing the storing process with respect to the immobilizer token comprises:

receiving, from the owner device, a request of performing a process of updating an entitlement of the digital key which comprises the request of performing the storing process with respect to the immobilizer token, and the transmitting of the immobilizer token issuance request comprises transmitting, to the owner device, the immobilizer token issuance request along with an issuance request of an updated digital key attestation indicating an updated entitlement of the digital key.

5. The method of claim 4, wherein the receiving of the encrypted immobilizer token and the second temporary public encryption key comprises:

receiving, from the owner device, the updated digital key attestation along with the encrypted immobilizer token and the second temporary public encryption key, and the method further comprises storing the updated digital key attestation, and wherein the updated digital key attestation comprises a public key of the target device, updated entitlement information of the digital key, and a signature of the owner device.

6. The method of claim 1, wherein the immobilizer token issuance device is one of service provision servers related to the owner device and the electronic device, and wherein the receiving of the request of performing the storing process with respect to the immobilizer token comprises receiving, from the electronic device, information about the immobilizer token issuance device along with the request of performing the storing process with respect to the immobilizer token.

7. The method of claim 6, wherein the transmitting of the immobilizer token issuance request comprises transmitting the immobilizer token issuance request to the immobilizer token issuance device, based on the information about the immobilizer token issuance device, and wherein the immobilizer token issuance request comprises an identifier (ID) of the digital key.

8. A method performed by an immobilizer token issuance device for updating an immobilizer token, the method comprising:

receiving, from a target device, a request of issuing the immobilizer token comprising a first temporary public encryption key of a first temporary encryption key pair generated by the target device;

wherein the first temporary encryption key pair is associated with an access to a confidential mailbox of a digital key of the target device, wherein the first temporary public encryption key is included in a form of an encryption key attestation, wherein the encryption key attestation includes the first temporary public encryption key and a value obtained by signing the first temporary public encryption key with a first temporary private encryption key, and wherein the encryption key attestation is associated with an authentication that the first temporary encryption key pair is for the access to the confidential mailbox of the digital key of the target device;

verifying the signing in the encryption key attestation;

generating a second temporary encryption key pair for encryption and decryption of the immobilizer token;

encrypting the immobilizer token by using the first temporary public encryption key received from the target device and a second temporary private encryption key of the generated second temporary encryption key pair, the immobilizer token being decrypted by the target device using a second temporary public encryption key and the first temporary private encryption key of the generated first temporary encryption key pair and stored in the confidential mailbox of the digital key and updated based on the first temporary encryption key pair; and transmitting, to the target device, the encrypted immobilizer token and a-the second temporary public encryption key of the second temporary encryption key pair.

9. The method of claim 8, wherein the immobilizer token issuance device is an owner device that has issued the digital key to the target device, wherein the method further comprises transmitting a request of performing a storing process with respect to an immobilizer token corresponding to the digital key, and wherein the immobilizer token issuance request is received from the target device, in response to the transmitted request of performing the storing process with respect to the immobilizer token.

10. The method of claim 9, further comprising generating an updated digital key attestation indicating an updated entitlement of the digital key, and wherein the transmitting of the request of performing the storing process with respect to the immobilizer token comprises transmitting, to the target device, the updated digital key attestation along with the request of performing the storing process with respect to the immobilizer token, and wherein the updated digital key attestation comprises a public key of the target device, updated entitlement information of the digital key, and a signature of the owner device.

11. The method of claim 9, wherein the transmitting of the request of performing the storing process with respect to the immobilizer token comprises transmitting, to the target device, a request of performing a process of updating an entitlement of the digital key, the request comprising the request of performing the storing process with respect to the immobilizer token, and wherein the receiving of the immobilizer token issuance request comprises receiving, from the target device, the immobilizer token issuance request along with a request of issuing an updated digital key attestation indicating an updated entitlement of the digital key.

12. The method of claim 9, further comprising generating an updated digital key attestation, wherein the transmitting of the encrypted immobilizer token and the second temporary public encryption key comprises transmitting, to the target device, the updated digital key attestation along with the encrypted immobilizer token and the second temporary public encryption key, and wherein the updated digital key attestation comprises a public key of the target device, updated entitlement information of the digital key, and a signature of the owner device.

13. The method of claim 8, wherein the immobilizer token issuance device is one of service provision servers associated with an owner device having issued the digital key to the target device and an electronic device being controlled by the digital key, and wherein the immobilizer token issuance request, which is received from the target device, comprises an identifier (ID) of the digital key.

14. A target device comprising: communication circuitry configured to communicate with an external device;
a secure element (SE) configured to store a digital key issued by an owner device;
memory storing data for processing the digital key; and
one or more processors,
wherein the memory stores one or more computer programs including computer-executable instructions that, when executed by the one or more processors, cause the target device to:
receive a request of performing a storing process with respect to an immobilizer token, from an owner device or from an electronic device, wherein a digital key for the target device is allowed by the owner device, the electronic device is controlled by the digital key, and wherein the request of performing the storing process with respect to the immobilizer token is associated with an updating process of the immobilizer token,
generate a first temporary encryption key pair for encryption and decryption of the immobilizer token, wherein the first temporary encryption key pair is associated with an access to a confidential mailbox of the digital key,
generate an encryption key attestation including a first temporary public encryption key and a value obtained by signing the first temporary public encryption key with a private key of the target device, wherein the encryption key attestation is associated with an authentication that the first temporary encryption key pair is for the access to the confidential mailbox of the digital key,
transmit, to an immobilizer token issuance device, an immobilizer token issuance request comprising the first temporary public encryption key, wherein the first temporary public encryption key is included in a form of the encryption key attestation, and wherein the signing in the encryption key attestation is verified by the immobilizer token issuance device,
receive, from the immobilizer token issuance device, an encrypted immobilizer token and a second temporary public encryption key generated by the immobilizer token issuance device,
decrypt the encrypted immobilizer token by using the second temporary public encryption key and a first temporary private encryption key of the generated first temporary encryption key pair, and update the immobilizer token based on the first temporary encryption key pair by storing the decrypted immobilizer token in the confidential mailbox of the digital key in the SE.

15. An immobilizer token issuance device comprising:
communication circuitry configured to communicate with an external device;
memory storing data for issuing an immobilizer token; and
one or more processors,
wherein the memory stores one or more computer programs including computer-executable instructions that, when executed by the one or more processors, cause the immobilizer token issuance device to:
receive, from a target device, a request of issuing an immobilizer token comprising a first temporary public encryption key of a first temporary encryption key pair generated by the target device,
wherein the first temporary encryption key pair is associated with an access to a confidential mailbox of a digital key of the target device,
wherein the first temporary public encryption key is included in a form of an encryption key attestation,
wherein the encryption key attestation includes the first temporary public encryption key and a value obtained by signing the first temporary public encryption key with a first temporary private encryption key, and
wherein the encryption key attestation is associated with an authentication that the first temporary encryption key pair is for the access to the confidential mailbox of the digital key of the target device,
verify the signing in the encryption key attestation,
generate a second temporary encryption key pair for encryption and decryption of the immobilizer token,
encrypt the immobilizer token by using the first temporary public encryption key received from the target device and a second temporary private encryption key of the generated second temporary encryption key pair the immobilizer token being decrypted by the target device using a second temporary public encryption key and the first temporary private encryption key of the generated first temporary encryption key pair and stored in the confidential mailbox of the digital key and updated based on the first temporary encryption key pair, and
transmit, to the target device, the encrypted immobilizer token and the second temporary public encryption key of the second temporary encryption key pair.

* * * * *